(12) United States Patent
Cook

(10) Patent No.: US 12,546,628 B2
(45) Date of Patent: Feb. 10, 2026

(54) INDUCTIVE ENCODER WITH SHIELD STRUCTURES

(71) Applicant: Mitutoyo Corporation, Kanagawa-ken (JP)

(72) Inventor: Ted Staton Cook, Kirkland, WA (US)

(73) Assignee: MITUTOYO CORPORATION, Kanagawa-Ken (JP)

( * ) Notice: Subject to any disclaimer, the term of this patent is extended or adjusted under 35 U.S.C. 154(b) by 190 days.

(21) Appl. No.: 18/497,842

(22) Filed: Oct. 30, 2023

(65) Prior Publication Data

US 2025/0137817 A1 May 1, 2025

(51) Int. Cl.
*G01D 5/20* (2006.01)

(52) U.S. Cl.
CPC ...................... *G01D 5/20* (2013.01)

(58) Field of Classification Search
CPC ................ G01D 5/20; G01D 5/2053
See application file for complete search history.

(56) References Cited

U.S. PATENT DOCUMENTS

| | | |
|---|---|---|
| 5,104,225 A | 4/1992 | Masreliez |
| 5,576,537 A | 11/1996 | Holzapfel et al. |
| 5,841,274 A | 11/1998 | Masreliez et al. |
| 5,886,519 A | 3/1999 | Masreliez et al. |
| 5,894,678 A | 4/1999 | Masreliez et al. |
| 5,901,458 A | 5/1999 | Andermo et al. |
| 5,936,399 A | 8/1999 | Andermo et al. |
| 5,973,494 A | 10/1999 | Masreliez et al. |
| 5,998,990 A | 12/1999 | Andermo et al. |
| 6,002,250 A | 12/1999 | Masreliez et al. |
| 6,005,387 A | 12/1999 | Andermo et al. |
| 6,011,389 A | 1/2000 | Masreliez et al. |
| 6,049,204 A | 4/2000 | Andermo et al. |
| 6,054,851 A | 4/2000 | Masreliez et al. |
| 6,124,708 A | 9/2000 | Dames |
| 6,157,188 A | 12/2000 | Steinke |
| 6,259,249 B1 | 7/2001 | Miyata |

(Continued)

FOREIGN PATENT DOCUMENTS

| | | |
|---|---|---|
| CN | 1272620 A | 11/2000 |
| CN | 1441226 A | 9/2003 |

(Continued)

*Primary Examiner* — Akm Zakaria
(74) *Attorney, Agent, or Firm* — Seed Intellectual Property Law Group

(57) ABSTRACT

An inductive encoder system includes a scale including a periodic scale pattern, and a detector portion configured to move along a measuring axis direction relative to the periodic scale pattern. The detector portion includes a field generating portion configured to generate a changing magnetic flux, and a sensing portion comprising one or more sets of sensing elements and configured to provide detector signals which respond to a local effect on the changing magnetic flux provided by the periodic scale pattern, wherein each set of sensing elements is coupled to a set of sensor vias. The detector portion further includes a plurality of shield structures SST, wherein each shield structure SST is located proximate to a set of sensor vias and comprises a plurality of shield vias, and in each shield structure one or more shield loops are formed by the plurality of shield vias as coupled together by conductor portions.

20 Claims, 13 Drawing Sheets

(56) References Cited

U.S. PATENT DOCUMENTS

| | | |
|---|---|---|
| 6,271,661 B2 | 8/2001 | Andermo et al. |
| 6,329,813 B1 | 12/2001 | Andermo |
| RE37,490 E | 1/2002 | Andermo et al. |
| 6,335,618 B1 | 1/2002 | Nahum |
| 6,396,264 B1 * | 5/2002 | Tamaki .................. H01P 3/085 324/249 |
| 6,400,138 B1 | 6/2002 | Andermo |
| 6,522,128 B1 | 2/2003 | Ely et al. |
| 6,522,129 B2 | 2/2003 | Miyata et al. |
| 6,531,866 B2 | 3/2003 | Miyata et al. |
| 6,545,461 B1 | 4/2003 | Miyata |
| 6,573,707 B2 | 6/2003 | Kiriyama et al. |
| 6,628,115 B2 | 9/2003 | Sasaki et al. |
| 6,646,433 B2 | 11/2003 | Milvich |
| 6,646,434 B2 | 11/2003 | Miyata et al. |
| 6,664,535 B1 | 12/2003 | Nahum et al. |
| 6,714,004 B2 | 3/2004 | Jagiella |
| 6,720,760 B2 | 4/2004 | Milvich |
| 6,781,694 B2 | 8/2004 | Nahum et al. |
| 6,867,412 B2 | 3/2005 | Patzwald et al. |
| 7,015,687 B2 | 3/2006 | Meyer |
| 7,126,495 B2 | 10/2006 | Netzer |
| 7,196,510 B2 | 3/2007 | Kawatoko |
| 7,239,130 B1 | 7/2007 | Milvich |
| 7,307,736 B2 | 12/2007 | Tobiason et al. |
| 7,530,177 B1 | 5/2009 | Meichle et al. |
| 7,608,813 B1 | 10/2009 | Milvich et al. |
| 7,652,469 B2 | 1/2010 | Meyer |
| 7,705,585 B2 | 4/2010 | Howard |
| 7,906,958 B2 | 3/2011 | Nakayama et al. |
| 8,094,323 B2 | 1/2012 | Kapner |
| 8,222,891 B2 | 7/2012 | Steinke et al. |
| 8,309,906 B2 | 11/2012 | Kapner et al. |
| 8,847,583 B2 | 9/2014 | Sasaki et al. |
| 8,928,311 B2 | 1/2015 | Sasaki |
| 9,018,578 B2 | 4/2015 | Tobiason et al. |
| 9,121,733 B2 | 9/2015 | Asano |
| 9,127,967 B2 | 9/2015 | Nagura |
| 9,228,823 B2 | 1/2016 | Fontanet et al. |
| 9,267,819 B2 | 2/2016 | Cook |
| 9,383,184 B2 | 7/2016 | Tiemann et al. |
| 9,435,663 B2 | 9/2016 | Cook |
| D774,928 S | 12/2016 | Matsumiya et al. |
| 9,612,136 B1 | 4/2017 | Cook |
| 9,618,366 B2 | 4/2017 | Nahum |
| 9,678,701 B2 | 6/2017 | Cook |
| 9,772,202 B1 | 9/2017 | Cook |
| 9,778,072 B1 | 10/2017 | Nahum |
| 9,833,802 B2 | 12/2017 | Kalistaja et al. |
| 9,835,473 B2 | 12/2017 | Nahum |
| 9,945,653 B2 * | 4/2018 | Howard .................. G01B 7/003 |
| 9,958,293 B2 * | 5/2018 | Elliott ....................... G01D 5/20 |
| 9,958,294 B2 | 5/2018 | Cook |
| 10,302,466 B2 | 5/2019 | Tobiason et al. |
| 10,422,666 B2 | 9/2019 | Cook |
| 10,520,335 B2 | 12/2019 | Cook |
| 10,551,217 B2 | 2/2020 | Cook |
| 10,591,316 B2 | 3/2020 | Cook |
| 10,612,943 B2 | 4/2020 | Cook |
| 10,775,199 B2 | 9/2020 | Cook |
| 11,067,414 B1 | 7/2021 | Cook |
| 11,713,983 B2 | 8/2023 | Cook |
| 12,222,366 B2 * | 2/2025 | Sim .......................... G01R 1/04 |
| 2001/0003422 A1 | 6/2001 | Andermo et al. |
| 2001/0020846 A1 | 9/2001 | Miyata |
| 2002/0030484 A1 | 3/2002 | Kiriyama et al. |
| 2002/0030485 A1 | 3/2002 | Gleixner |
| 2003/0090264 A1 | 5/2003 | Milvich |
| 2003/0128028 A1 | 7/2003 | Jordil |
| 2003/0160608 A1 | 8/2003 | Milvich |
| 2006/0103376 A1 | 5/2006 | Ma |
| 2009/0119940 A1 | 5/2009 | Meichle et al. |
| 2009/0174396 A1 * | 7/2009 | Howard .................. G01D 5/2053 324/207.24 |
| 2011/0254541 A1 | 10/2011 | Sasaki |
| 2012/0007591 A1 | 1/2012 | Howard et al. |
| 2014/0184202 A1 | 7/2014 | Horiguchi et al. |
| 2015/0375246 A1 | 12/2015 | Kalistaja et al. |
| 2016/0054154 A1 | 2/2016 | Cook |
| 2016/0146636 A1 | 5/2016 | Nahum |
| 2017/0089738 A1 | 3/2017 | Cook |
| 2017/0268905 A1 | 9/2017 | Nahum |
| 2017/0268906 A1 | 9/2017 | Nahum |
| 2018/0003524 A1 | 1/2018 | Cook |
| 2018/0058883 A1 | 3/2018 | Cook |
| 2018/0087928 A1 | 3/2018 | Jones |
| 2018/0113004 A1 | 4/2018 | Cook |
| 2018/0180452 A1 | 6/2018 | Cook |
| 2018/0195880 A1 | 7/2018 | Cook |
| 2019/0120660 A1 | 4/2019 | Hitchman et al. |
| 2019/0301895 A1 | 10/2019 | Cook |
| 2020/0003581 A1 | 1/2020 | Cook et al. |
| 2020/0003583 A1 | 1/2020 | Cook |
| 2022/0205814 A1 | 6/2022 | Cook |

FOREIGN PATENT DOCUMENTS

| | | |
|---|---|---|
| CN | 105415882 A | 3/2016 |
| EP | 1014041 A1 | 6/2000 |
| JP | 2018004628 A | 1/2018 |
| JP | 2018031777 A | 3/2018 |
| JP | 2018105854 A | 7/2018 |

* cited by examiner

1300

1310 — Provide a drive signal that causes a field generating portion of a detector portion of an inductive encoder to generate a changing magnetic flux, wherein the operation of the field generating portion produces one or more stray magnetic fields and the detector portion includes a sensing portion comprising one or more sets of sensing elements arranged along a measuring axis direction, and each set of sensing elements is coupled to a set of sensor vias and the detector portion is configured to move along the measuring axis direction relative to a scale that includes signal modulating elements 1320 — Receive detector signals from the sensing portion, wherein at least one set of sensor vias is at least partially shielded from the one or more stray magnetic fields by the plurality of shield structures (e.g., wherein at least some sensor vias of the at least one set of sensor vias form at least part of one or more parasitic loops, and the shielding of the at least one set of sensor vias reduces an offset signal portion in the detector signals that would otherwise result from the one or more stray magnetic fields coupling to the one or more parasitic loops if the shield structures were not present)

1330 — Determine a relative position between the detector portion and the scale based at least in part on the detector signals (e.g., wherein the plurality of shield structures are configured to prevent the determined relative position from including at least a portion of a position error that would otherwise be caused by the offset signal portion as would result if the shield structures were not present)

FIG. 13

INDUCTIVE ENCODER WITH SHIELD STRUCTURES

BACKGROUND

Technical Field

This disclosure relates to metrology and, more particularly, to inductive encoders.

Description of the Related Art

Various position encoder configurations may include various types of inductive, optical, capacitive, magnetic, movement and/or position transducers. These position encoders use various geometric configurations (e.g., of a transmitter and a receiver) in a detector portion (e.g., as included in a readhead) to measure movement between the detector portion and a scale.

As some examples of inductive encoders, U.S. Pat. No. 6,011,389 (the '389 patent) and U.S. Pat. No. 6,124,708 (the '708 patent) describe induced current position transducers usable in high accuracy applications; U.S. Pat. No. 5,973,494 (the '494 patent) and U.S. Pat. No. 6,002,250 (the '250 patent) describe incremental position inductive calipers and linear scales, including signal generating and processing circuits; and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 10,520,335 (the '335 patent), U.S. Pat. No. 10,612,943 (the '943 patent) and U.S. Pat. No. 10,775,199 (the '199 patent) disclose winding configuration refinements that are useful for enhancing the accuracy, robustness, and ease of alignment of inductive encoders. All of the foregoing are hereby incorporated herein by reference in their entireties.

As described in these patents, an inductive encoder may be manufactured using printed circuit board (PCB) technology and is largely immune to contamination. However, such systems may be limited in their ability to provide certain combinations of features desired by users, such as combinations of consistency of measurements, high accuracy, high resolution, robustness to contamination, compact size, ease of use, low cost, etc. Configurations of inductive encoders that provide improved combinations of such features would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect, an inductive encoder system is provided which is configured to measure a relative position between two elements along a measuring axis direction. The system includes a scale extending along the measuring axis direction which includes a periodic scale pattern comprising signal modulating elements; and a detector portion configured to be positioned proximate to the periodic scale pattern and to move along the measuring axis direction relative to the periodic scale pattern. The detector portion includes a field generating portion PRTFGE configured to generate a changing magnetic flux in response to a drive signal; and a sensing portion PRTSEN comprising one or more sets of sensing elements arranged along the measuring axis direction. Each set of sensing elements is coupled to a set of sensor vias, and the sensing portion PRTSEN is configured to provide detector signals which respond to a local effect on the changing magnetic flux provided by adjacent signal modulating elements of the periodic scale pattern. The detector portion also includes a plurality of shield structures SST, wherein each shield structure SST is located proximate to a set of sensor vias. Each shield structure SST comprises a plurality of shield vias, and in each shield structure SST one or more shield loops are formed by the plurality of shield vias as coupled together by conductor portions.

In exemplary implementations, the plurality of shield structures SST are configured to at least partially shield the set of sensor vias from stray magnetic fields that result from the operation of the field generating portion PRTFGE. In accordance with such exemplary implementations, the shielding of the set of sensor vias is technically advantageous to reduce an offset signal portion in the detector signals that would otherwise result from the stray magnetic fields coupling to parasitic loops which may be formed by at least some of the set of sensor vias.

In accordance with a further aspect, a method is provided of operating the inductive encoder system configured to measure a relative position between two elements along a measuring axis direction. The method includes generally three steps. The first step includes providing a drive signal that causes the field generating portion PRTFGE to generate the changing magnetic flux, wherein the operation of the field generating portion PRTFGE produces one or more stray magnetic fields. The second step includes receiving detector signals from the sensing portion PRTSEN, wherein at least one set of sensor vias is at least partially shielded from the one or more stray magnetic fields by the plurality of shield structures. The third step includes determining a relative position between the detector portion and the scale based at least in part on the detector signals.

In accordance with a further aspect, a detector portion is provided for use in an inductive encoder configured to measure a relative position between two elements along a measuring axis direction. The encoder includes a scale extending along the measuring axis direction which includes a periodic scale pattern comprising signal modulating elements. The detector portion is configured to be positioned proximate to the periodic scale pattern and to move along the measuring axis direction relative to the periodic scale pattern. The detector portion includes a field generating portion PRTFGE configured to generate a changing magnetic flux in response to a drive signal; and a sensing portion PRTSEN comprising one or more sets of sensing elements arranged along the measuring axis direction. Each set of sensing elements is coupled to a plurality sensor vias, and the sensing portion PRTSEN is configured to provide detector signals which respond to a local effect on the changing magnetic flux provided by adjacent signal modulating elements of the periodic scale pattern. The detector portion further includes a plurality of shield structures SST, wherein each shield structure SST is located proximate to a set of sensor vias. Each shield structure SST comprises a plurality of shield vias, and in each shield structure SST one or more shield loops are formed by the plurality of shield vias as coupled together by conductor portions.

BRIEF DESCRIPTION OF THE DRAWINGS

FIG. 13 is a flow diagram illustrating a routine for operating an inductive encoder system.

DETAILED DESCRIPTION

Figure 1:
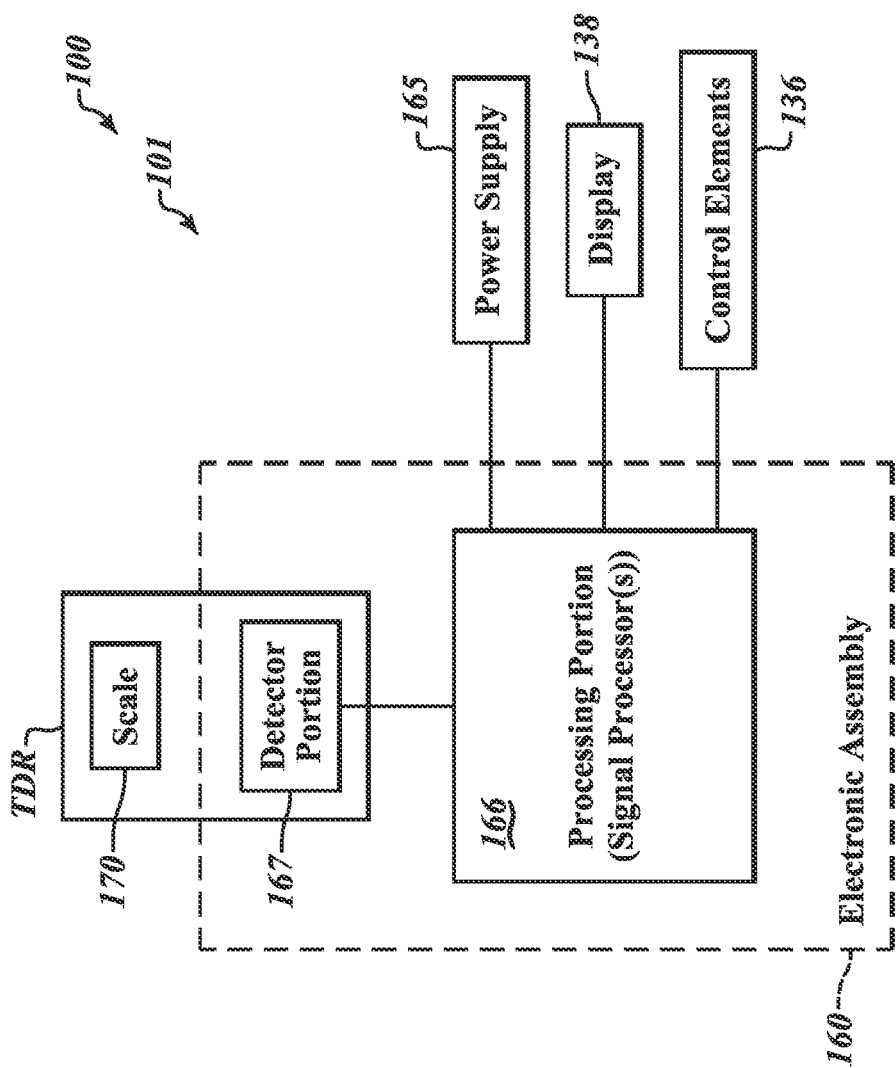
FIG. 1 is a block diagram of an inductive encoder system.

FIG. 1 is a block diagram of exemplary components of an inductive encoder system 100 including an inductive encoder 101. In various implementations, the inductive encoder 101 includes a scale 170 and a detector portion 167, which together form a transducer TDR. The inductive encoder 101 includes suitable user interface features such as a display 138 and/or user-operable control elements 136 (e.g., switches, buttons, etc.). In some implementations, the inductive encoder 101 may be used as part of a wireless-only device or other configuration (e.g., without the encoder 101 including a display). For example, the system 100 may include a corresponding remote display, such as part of a phone or tablet, via Bluetooth® or other connection. The encoder 101 may additionally include a power supply 165.

All of these elements of the encoder 101 are coupled to a processing portion 166 (e.g., including one or more signal processors and in some implementations a memory), which in various implementations may be embodied as a signal processing and display electronic circuit in integrated circuit (IC) chip(s).

The processing portion 166 receives detector signals from the detector portion 167 and processes the detector signals to determine a position (e.g., in some implementations an absolute position) of the detector portion 167 along the scale 170. It will be appreciated that the processing portion 166 may comprise any combination of signal processing and physical circuitry. In various implementations, the processing portion 166 and the detector portion 167 may be included as part of an electronic assembly 160 (e.g., as arranged on a substrate, etc.). In various implementations, the control elements 136, display 138 and/or power supply 165 may be included in the encoder 101 (and/or may be partially or fully included in a separate device or system, such as a host system or other device which may be part of the overall encoder system 100).

It will be appreciated that such inductive encoders have evolved over a number of years to provide a relatively optimized combination of high resolution and high accuracy measurements, ease of use, compact size, low power operation, low cost, robustness to contamination, etc. Even small improvements in any of these factors are highly desirable, but difficult to achieve, especially in light of the design constraints imposed in order to achieve commercial success in the various applications. The principles disclosed herein provide improvements in certain of these factors for various applications.

Those skilled in the art will appreciate that the processing portion 166 and/or detector portion 167 (and/or any other control systems or control portions as described herein) may generally be implemented using any suitable computing devices and/or systems, including distributed or networked computing environments, and the like. Such computing devices and/or systems may include one or more general purpose or special purpose processors (e.g., non-custom or custom devices) that execute software to perform the functions described herein. Software may be stored in memory, such as random access memory (RAM), read only memory (ROM), flash memory, or the like, or a combination of such components. Software may also be stored in one or more storage devices, such as optical based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing devices or systems and accessed via service calls, either in a wired or wireless configuration.

Figure 2:
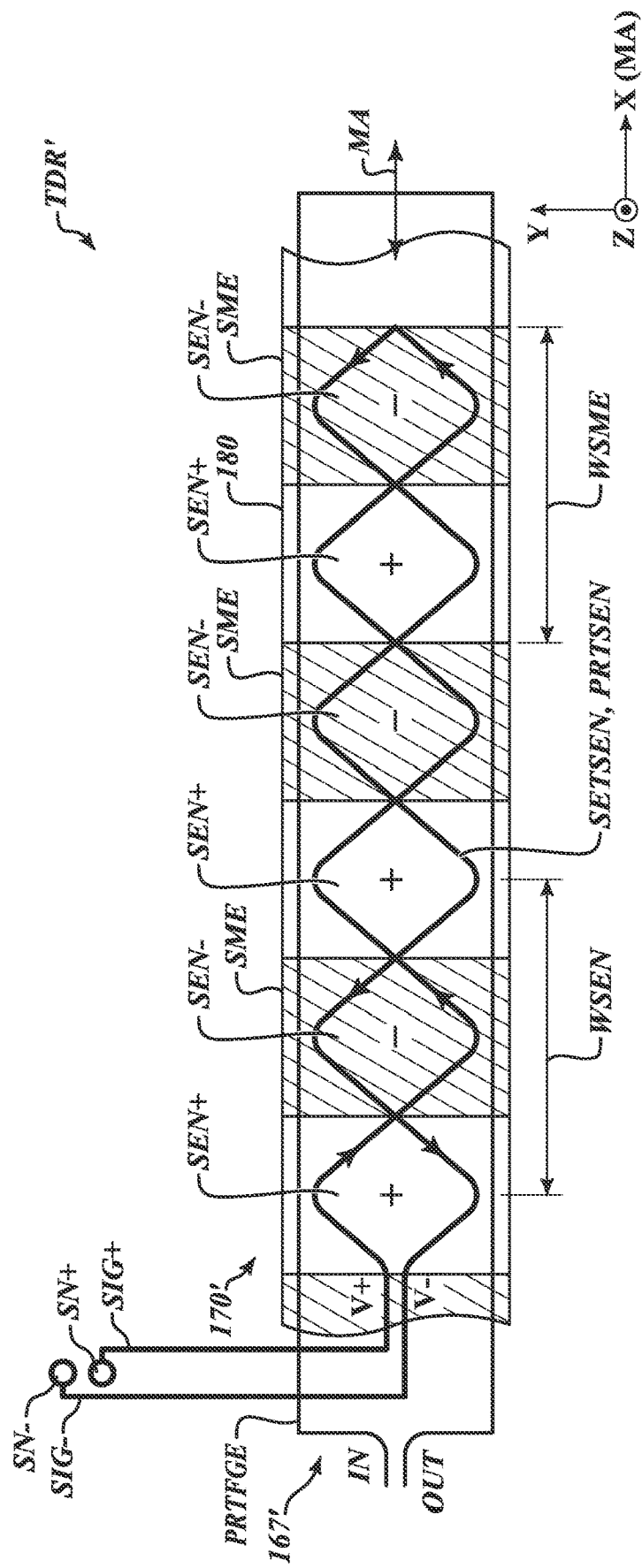
FIG. 2 is a diagram of an implementation of a transducer including a detector portion and a scale such as may be utilized in the inductive encoder system of FIG. 1.

FIG. 2 is a diagram of an implementation of a transducer TDR' including a detector portion 167' and a scale 170' (e.g., which may be particular implementations of the transducer TDR, detector portion 167, and scale 170 as described above with respect to FIG. 1). The detector portion 167' includes a field generating portion PRTFGE and a sensing portion PRTSEN. In the simplified example of FIG. 2, the detector portion 167' includes at least two substantially coplanar paths of wire or windings (PRTFGE and PRTSEN). The field generating portion PRTFGE includes a field generating winding (e.g., which in some implementations may also be referenced as a transmitter winding or a transmitter coil)

which forms a large planar loop. In exemplary implementations, the field generating winding defines (or surrounds) an interior area that is aligned with the periodic scale pattern 180 of the signal modulating elements SME, to generate a changing magnetic flux in the interior area in response to a field generating drive signal. The sensing portion PRTSEN includes a set of sensing elements SETSEN including sensing elements SEN+ and SEN− formed by a sensing winding (e.g., which in some implementations may also or alternatively be referred to as a receiver winding or a receiver coil), in substantially the same or a very near parallel plane as the field generating winding of the field generating portion PRTFGE (e.g., such as on adjacent or otherwise very close layers of a PCB).

The sensing winding of the sensing portion PRTSEN is laid out in one direction as indicated by the arrows in a zig-zag or sinusoidal pattern and then in a reverse direction as indicated by the arrows so that the winding crosses over itself (e.g., with insulation and/or on different PCB layers at the crossover points to avoid short circuits) to form alternating loops which are designated as the sensing elements SEN+ and SEN− interposed between each other, as shown. As a result, each of the alternating loops of the sensing elements SEN+ and SEN− of the set of sensing elements SETSEN has a different winding direction as compared to its adjacent loops. By applying an alternating (changing) current to the field generating portion PRTFGE, the field generating winding produces a time-varying magnetic field (a changing magnetic flux), extending through the loops of the sensing elements SEN+ and SEN− of the set of sensing elements SETSEN of the sensing portion PRTSEN.

The scale 170' includes a periodic scale pattern 180 comprising signal modulating elements SME. In various implementations, the periodic scale pattern 180 has a spatial wavelength WSME and has signal modulating elements SME of a first type comprising similar conductive plates (as indicated by diagonal hatching in FIG. 2) that are located along the measuring axis direction MA corresponding to the spatial wavelength WSME.

As a principle of operation, if the scale 170' including the scale periodic pattern 180 with the signal modulating elements SME is moved close (proximate) to the detector portion 167', the varying magnetic field generated by the field generating portion PRTFGE will induce eddy currents in the proximate signal modulating elements SME, which in turn sets up a magnetic field from the signal modulating elements SME that counteracts the varying magnetic field (the changing magnetic flux). As a result, the magnetic flux that the sensing winding of the sensing portion PRTSEN receives is altered or disrupted, thereby causing the sensing winding to output a non-zero electromagnetic field (EMF) signal (a voltage) at the output terminals V+ and V− of the sensing winding of the sensing portion PRTSEN, which will increase or decrease and will change polarity as the signal modulating elements SME move between being aligned with the "+" and "−" loops of the sensing elements SEN+ and SEN−, as will be described in more detail below.

The distance between the location of two sensing elements of the same polarity, (e.g., between the location of sensing element SEN+ to the location of the next sensing element SEN+) is defined as a pitch or wavelength WSEN of the set of sensing elements SETSEN of the sensing portion PRTSEN, and in certain implementations may be equal to the pitch or wavelength WSME of the periodic scale pattern 180 of the scale 170'. It may be seen that each sensing element SEN+ and SEN− therefore has a length or maximum dimension 0.5*WSEN along the measuring axis direction MA. If the signal modulating elements SME (e.g., conductive plates) that are proximate to the sensing portion PRTSEN are continuously varied in position along the measuring axis direction MA, the alternating current (AC) amplitude of the signal output from the sensing portion PRTSEN will vary continuously and periodically with the wavelength WSME due to the periodic alteration of the sensing elements SEN+ and SEN− and local disruption of the transmitted magnetic field caused by the signal modulating elements SME. The signal output from the sensing portion PRTSEN may thus be utilized (e.g., processed) to indicate a relative position between the detector portion 167' and the scale 170'.

During operations, alternating current may be provided, although in order to simplify certain parts of the description herein only one direction of current is described (e.g., for purposes of example of one direction of current and/or as may occur in configurations where diodes or other components/configurations are provided to limit the current flow to one direction). As one example, current (e.g., as provided by field generating drive signals, such as from and/or controlled by the processing portion 166) may flow through the field generating winding of the field generating portion PRTFGE from the terminal "IN" to the terminal "OUT". More specifically, this indicates a current flow in a clockwise direction, which generates a corresponding magnetic flux, for example, within an interior area which is aligned with the sensing portion PRTSEN. As noted above, such current flow (e.g., with the resulting magnetic flux as affected by the signal modulating elements SME) results in generated signals in sensing elements SEN+ and SEN− in the sensing portion PRTSEN.

As an example of how the inductive encoder 101 operates, as the scale 170' and its signal modulating elements SME move with respect to the detector portion 167' (e.g., as corresponding to movement of the detector portion 167' relative to the scale 170', or vice versa), the signal modulating elements SME alternatively cover or are placed in proximal relation to all of the "+" loops of the sensing elements SEN+ or all of the "−" loops of the sensing elements SEN−. In the position indicated in FIG. 2, the signal modulating elements SME are proximate to, or "overlap" (e.g., are aligned with), all of the "−" loops of the sensing elements SEN− in the sensing portion PRTSEN. As the field generating winding of the field generating portion PRTFGE inductively couples to, and induces eddy currents in, the signal modulating elements SME, the signal modulating elements SME produce a magnetic field that counteracts the magnetic field passing through the sensing elements SEN−. The sensing elements SEN−, therefore, generate less induced electromagnetic field (EMF) than the sensing elements SEN+, which fully receive the flux from the magnetic field. Consequently, in this example, the sensing portion PRTSEN produces a net "positive" polarity EMF, current, and/or voltage, at its output. The output signal varies with time because the field generating portion PRTFGE generates a time-varying magnetic field. The amplitude and polarity of the time varying output signal, relative to the input signal, provides an indication of position between the detector portion 167' and the scale 170'.

Alternatively, as the scale 170' is moved (not shown) so that the signal modulating elements SME overlap (e.g., are aligned with) the "+" loops of the sensing elements SEN+, the induced current generated in the signal modulating elements SME counteracts the flux of the magnetic field passing through the "+" loops of the sensing elements SEN+. As a result, the sensing elements SEN− generate more induced EMF than the sensing elements SEN+. Consequently, the sensing portion PRTSEN generates a net "negative" polarity EMF, current and/or voltage at its output.

In one example, the circuitry of the processing portion 166 is coupled to the terminals V+ and V− of the sensing portion PRTSEN (e.g., for receiving the detector signals) and samples the changes in the signal output from the sensing portion PRTSEN (e.g., either voltage or current changes) and thereby computes linear position/distance of the detector portion 167' along the scale 170'. Although FIG. 2 shows a single set of sensing elements for simplicity and to avoid visual confusion, in various implementations the sensing portion PRTSEN includes one or more additional sets of sensing elements (e.g., similar to SETSEN as illustrated) at different spatial phase positions (e.g., to provide quadrature signals), as will be understood by one of ordinary skill in the art. In addition, in various implementations one or more additional scale tracks (e.g., pattern portions) are included as part of the scale 170, along with one or more additional corresponding sets of sensing elements of the sensing portion PRTSEN. For example, in some implementations the scale tracks may have a spatial phase offset relative to one another or the wavelengths of each scale track set may differ from WSME and WSEN, for which processing of the signals in combination may provide an absolute measurement, etc. Certain examples of such principles are described in part in U.S. Pat. Nos. 9,772,202 and 11,713,983, each of which is hereby incorporated herein by reference in its entirety.

It will also be appreciated that the configurations of sensing elements described herein are intended to be exemplary only, and not limiting. As one example, individual sensing element loops may output individual signals to a corresponding processing portion in some implementations, for example as disclosed in U.S. Pat. No. 9,958,294, which is hereby incorporated herein by reference in its entirety. More generally, various known sensing element configurations may be used in combination with the principles disclosed and claimed herein, for use in combination with various known scale pattern and signal processing schemes, in various implementations. In relation to such implementations, it will be appreciated that references herein to processing the detector signals from the sensing portion PRTSEN of the detector portion 167 (e.g., for determining a relative position) may include processing and/or combining signals from different sets of sensing elements SETSENs (e.g., in quadrature and/or from different scale tracks and/or as part of a three or four phase system, etc.).

The scale 170 and detector portion 167 and/or other elements as described herein may be readily manufactured by conventional techniques. For example, known printed circuit board (PCB) techniques (on rigid or flexible substrates) can be used to manufacture the detector portion 167 by forming the field generating portion PRTFGE and the sensing portion PRTSEN (e.g., including the windings thereof) on a PCB substrate. Appropriate insulation and/or elements or portions of different elements on different layers of the PCB may be included at transition points between the "+" and "−" loops of the sensing elements SEN+ and SEN− where the set of sensing elements SESTSEN crosses over itself, in order to prevent short circuiting of the winding at the transition or cross-over points. Similarly, known PCB techniques can be used to manufacture the scale 170 by forming the signal modulating elements SME on a PCB substrate.

In accordance with standard PCB fabrication processes, "vias" may be utilized for connections between different layers of a PCB (e.g., for which the vias may sometimes also or alternatively be known as "plated through-holes" or "through-vias" in the PCB). As illustrated in FIG. 2, there are two vias SN+ and SN− connected to the terminals V+ and V− of the set of sensing elements SETSEN. The vias SN+ and SN− are correspondingly referenced as "sensor vias" herein. Signal lines SIG+ and SIG− connect the terminals V+ and V− of the set of sensing elements SETSEN to the sensor vias SN+ and SN−, for which the sensor vias SN+ and SN− are then connected out to the processing portion 166 (e.g., which may include electronics on different layers of the PCB in relation to the layers that include the set of sensing elements SETSEN, and for which the sensor vias SN+ and SN− provide the necessary connections between the different layers of the PCB).

As will be described in more detail below, in various implementations, certain of the connections from the set of sensing elements SETSEN to the processing portion 166, in particular certain of the connections to and from the sensor vias SN+ and SN−, may form parasitic loops (e.g., "parasitic sensor loops"). An example of such a parasitic sensor loop LSN-A will be described in more detail below with respect to FIG. 3. As will be described in more detail below, any currents induced in such parasitic sensor loops may result in an offset signal which introduces error into the position calculations/determinations of the inductive encoder 101.

More specifically, as noted above, for ideal inductive encoder operations, detector signals are produced based on the interactions of the signal modulating elements SME of the scale 170 with the magnetic field/flux as produced by the field generating portion PRTFGE and as sensed by the sensing elements (e.g., as part of the set of sensing elements SETSEN, etc.). These signals correspondingly provide a highly accurate indication of the position of the detector portion 167 in relation to the scale 170. However, if "stray magnetic fields" induce currents in parasitic sensor loops (e.g., as described above), such may result in offset signals in the detector signals as received by the processing portion 166, which may result in errors in the position calculations/determinations of the inductive encoder 101. As will be described in more detail below (e.g., with respect to FIGS. 5 and 6), in some cases, such stray magnetic fields may be produced by current flow through "field generating vias" (i.e., vias utilized for connections between different layers of the PCB for the field generating portion PRTFGE). As will further be described in more detail below with respect to FIGS. 4-13, in accordance with principles as disclosed herein, in order to reduce the effects of such issues, shield structures including shield vias (e.g., which are utilized to form shield loops) are provided as located proximate to the sensor vias (e.g., for providing certain shielding effects, etc.)

Figure 3:
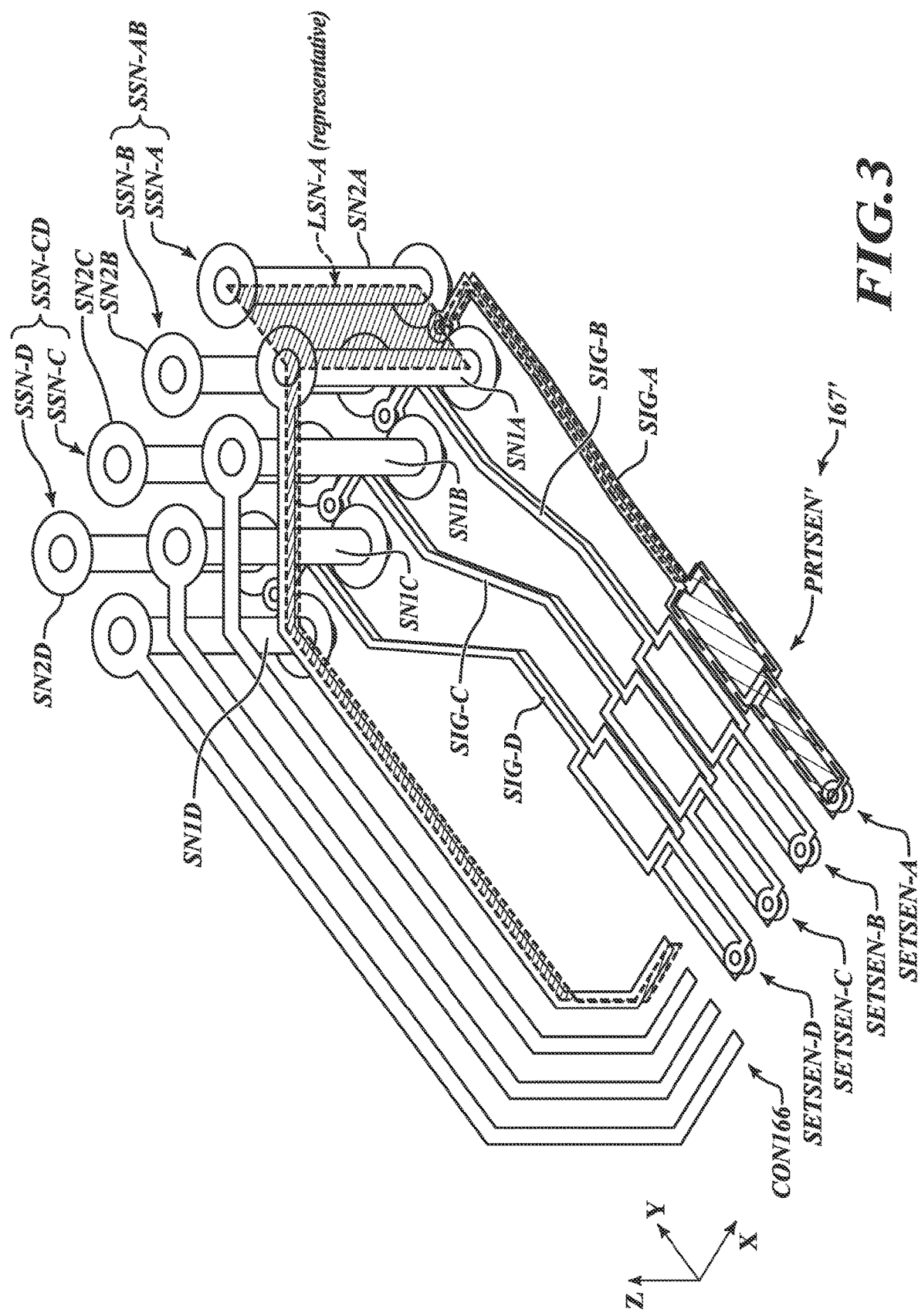
FIG. 3 is a diagram illustrating connections from sets of sensing elements of a detector portion to sets of sensor vias and to a processing portion, for which the connections form parasitic sensor loops.

FIG. 3 is a diagram illustrating connections from four sets of sensing elements SETSEN-A, SESEN-B, SETSEN-C and SETSEN-D to four sets of sensor vias SSN-A (including two sensor vias SN1A/SN2A), SSN-B (including two sensor vias SN1B/SN2B), SSN-C (including two sensor vias SN1C/SN2C) and SSN-D (including two sensor vias SN1D/SN2D). A larger set of sensor vias SSN-AB combines two sets of sensor vias SSN-A and SSN-B to include four sensor vias SN1A/SN2A and SN1B/SN2B. A larger set of sensor vias SSN-CD combines two sets of sensor vias SSN-C and SSN-D to include four sensor vias SN1C/SN2C and SN1D/SN2D. Signal lines SIG-A, SIG-B, SIG-C and SIG-D carry the respective signals from the sets of sensing elements SETSEN-A, SETSEN-B, SETSEN-C and SETSEN-D included in the sensor portion PRTSEN' to the four sets of sensor vias SSN-A, SSN-B, SSN-C and SSN-D. Connections CON166 are signal lines from the four sets of sensor vias SSN-A, SSN-B, SSN-C and SSN-D to a processing portion (e.g., processing portion 166), for which the connections may form parasitic loops (e.g., parasitic sensor loops).

Specifically, the connections CON166 to the processing portion 166 to and from the sets of sensor vias SSN-A, SSN-B, SSN-C and SSN-D may form parasitic sensor loops (e.g., in which currents may be induced by "stray magnetic fields", such as will be described in more detail below). As an example of one such parasitic sensor loop, a parasitic sensor loop LSN-A is indicated by broken lines in FIG. 2, wherein at least part of the interior of the parasitic sensor loop LSN-A is indicated by hatching. As illustrated, the parasitic sensor loop LSN-A includes at least the first set of sensor vias SSN-A (including two sensor vias SN1A and SN2A), such as part of the connections CON166 to the processing portion 166. While only one parasitic sensor loop LSN-A is illustrated, it should be understood that additional parasitic sensor loops LSN-B, LSN-C and LSN-D may be similarly formed based on the connections CON166 from the other sets of sensor vias SSN-B, SSN-C and SSN-D to the processing portion 166. Any currents induced (e.g., as introduced by stray magnetic fields) in such parasitic sensor loops LSN-A, etc. may result in an offset signal which may introduce error in the position calculations/determinations of the inductive encoder 101. As will be described in more detail below, in order to address such issues, shield structures may be provided (e.g., which at least partially shield the sensor vias) to help prevent/reduce currents from being induced in the parasitic sensor loops.

Figure 4:
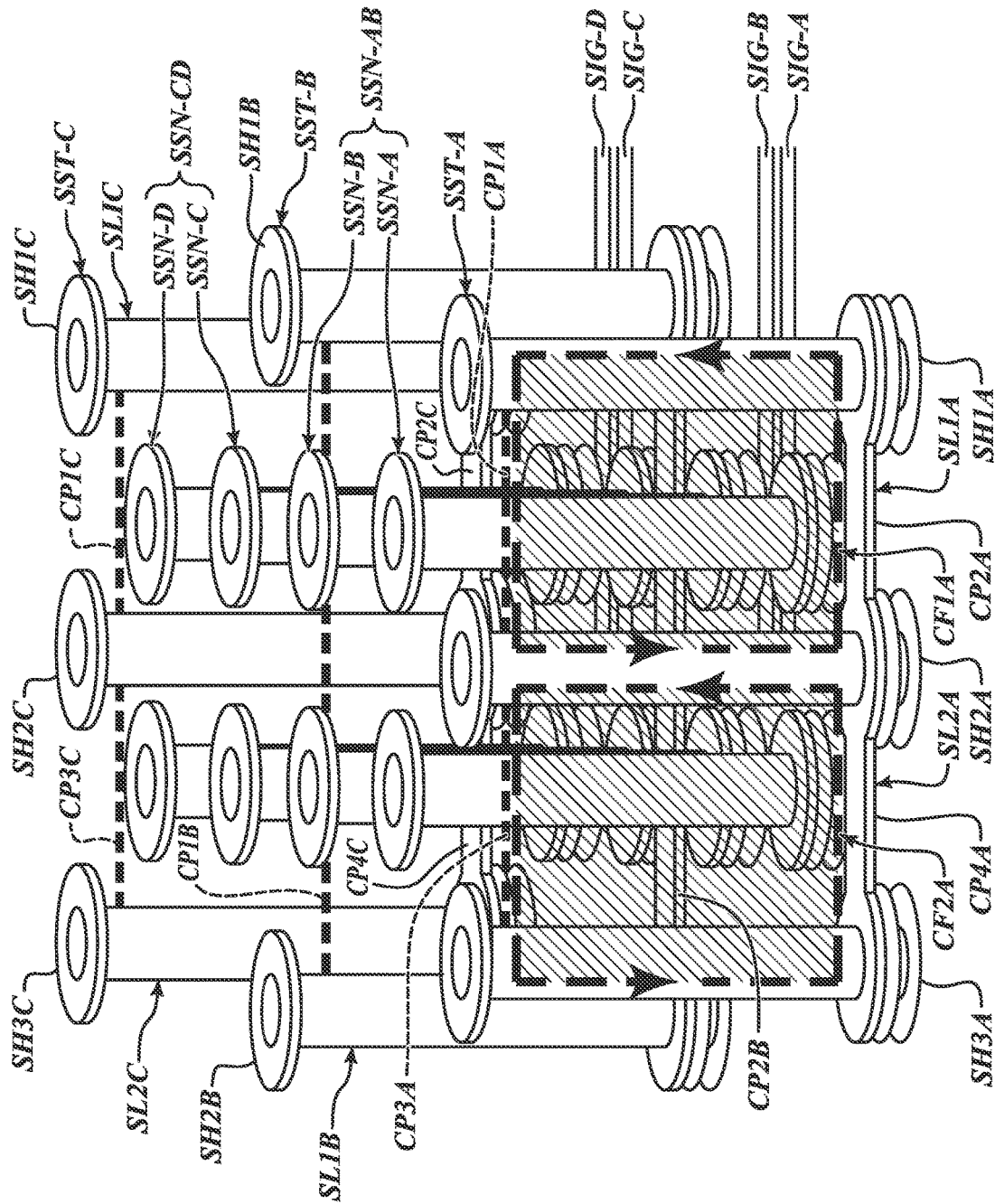
FIG. 4 is a diagram illustrating shield structures SST as located proximate to sets of sensor vias such as those illustrated in FIGS. 3 and 6.

FIG. 4 is a diagram illustrating shield structures SST as located proximate to the sets of sensor vias SSN (e.g., such as the sets of sensor vias SSN illustrated in FIGS. 3 and 6), configured according to an embodiment of the present invention. FIG. 4 illustrates three shield structures SST-A, SST-B and SST-C located proximate to the sets of sensor vias SSN-A, SSN-B, SSN-C and SSN-D and configured to at least in part shield the sensor vias SN included in those sets of sensor vias SSN-A, SSN-B, SSN-C and SSN-D (e.g., to at least in part shield the sensor vias from stray magnetic fields that could otherwise induce currents in the parasitic sensor loops which include the sensor vias). Each shield structure SST comprises a plurality of shield vias SH, wherein in each shield structure SST, one or more shield loops SL are formed by the plurality of shield vias SH as coupled together by conductor portions CP such that current (e.g., eddy current) is able to flow in a loop through each of the shield loops SL (e.g., as part of the shielding function for effectively shielding the sensor vias).

Figure 8:
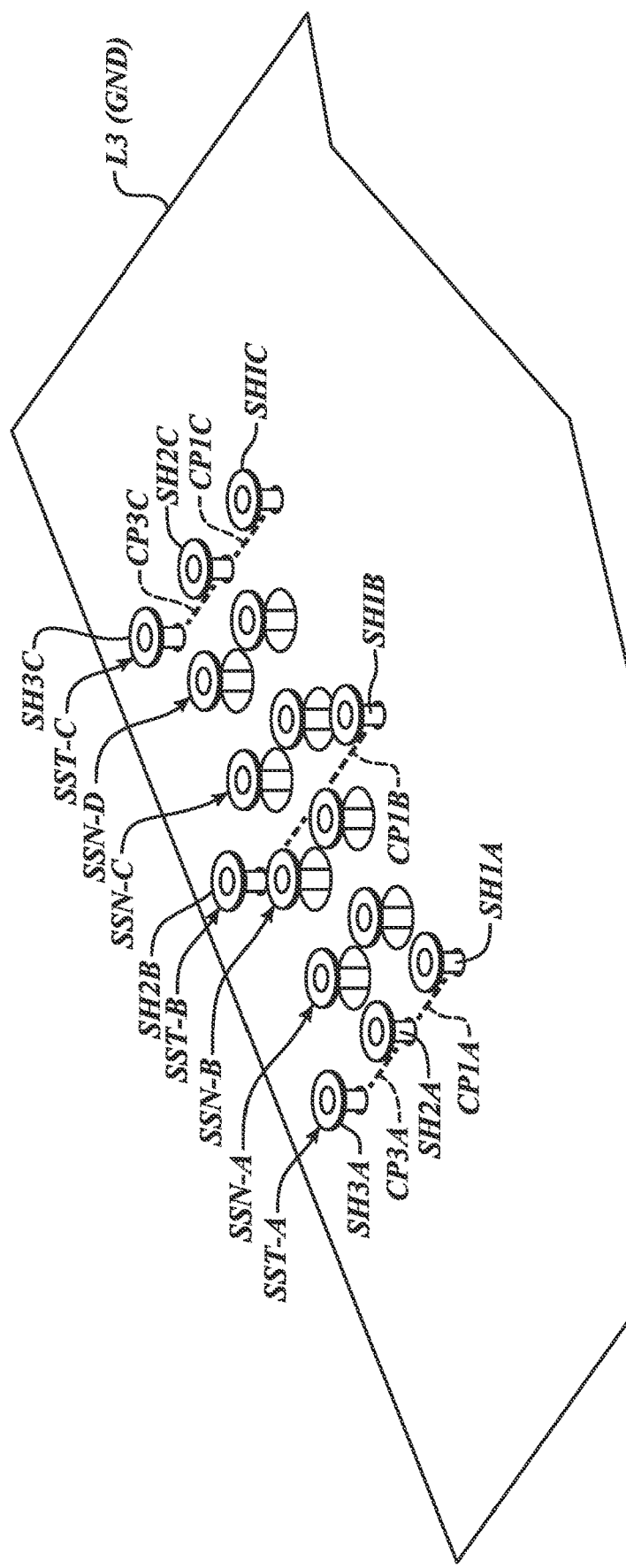
FIG. 8 is a diagram illustrating an isometric top view of the sensor vias along with the shield structures SST of FIG. 6, for which the shield vias of the shield structures SST are shown to be coupled together by conductor portions (e.g., upper conductor portions) as part of a ground layer (e.g., a layer L3) of the PCB.
Figure 9:
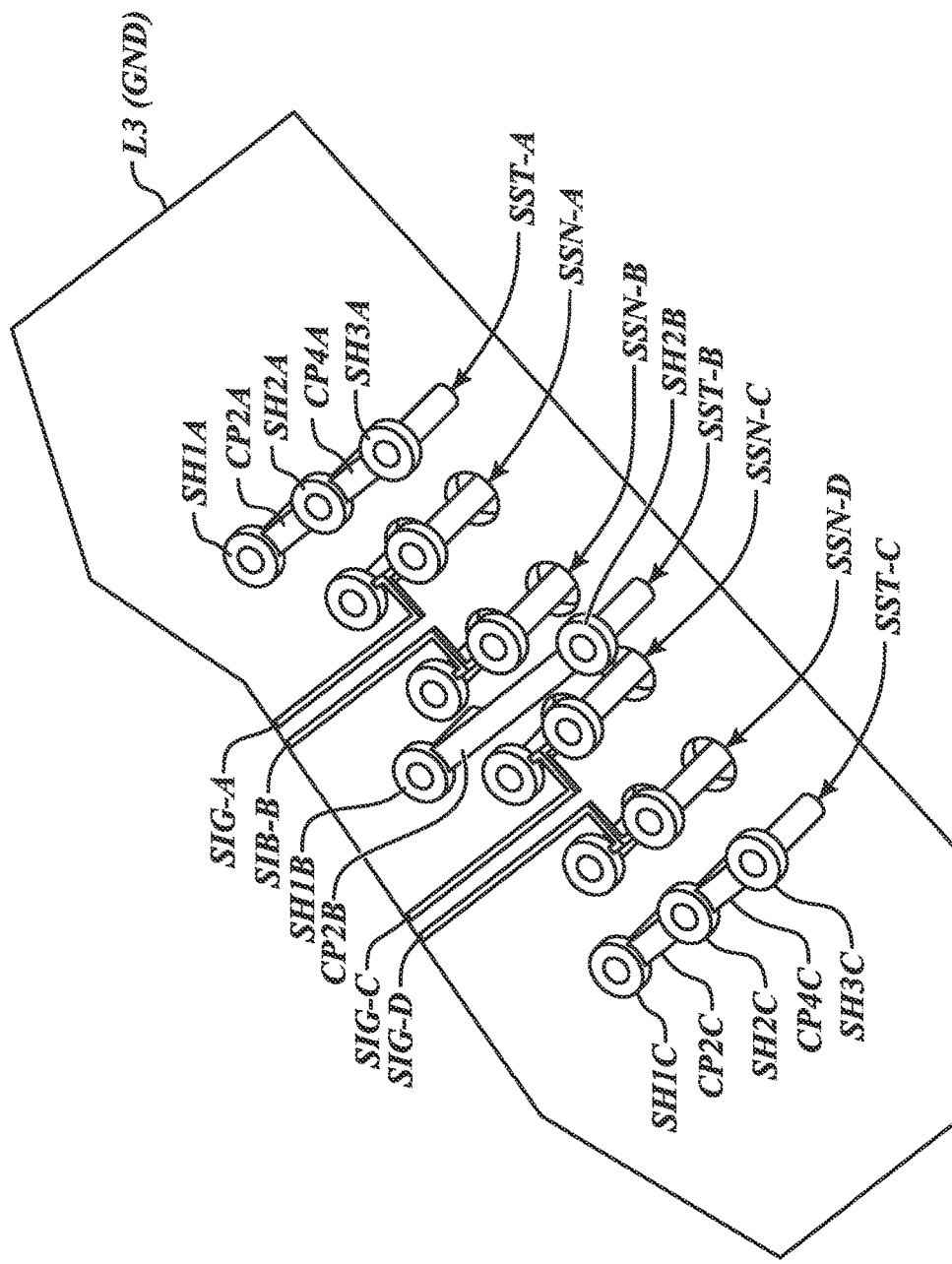
FIG. 9 is a diagram illustrating an isometric bottom view of the configuration of FIG. 8 (e.g., looking at the same layer L3 of FIG. 8 from below), for which the shield vias of the shield structures SST are shown to also be coupled together by conductor portions (e.g., lower conductor portions) in a different layer of the PCB (e.g., in layer L4, not shown) than the ground layer L3, thus forming shield loops in the shield structures SST.

Specifically, in FIG. 4, the first shield structure SST-A is located proximate to the set of sensor vias SSN-AB, and includes three shield vias SH1A, SH2A and SH3A to form first and second shield loops SL1A and SL2A. The first shield loop SL1A is formed by the shield vias SH1A and SH2A as coupled together by a first conductor portion CP1A (shown as a broken line) near the top of the shield vias SH1A and SH2A and a second conductor portion CP2A near the bottom of the shield vias SH1A and SH2A. As a result, current is able to flow in a loop such as illustrated by a current flow (arrow) CF1A through the first shield loop SL1A. Similarly, the second shield loop SL2A is formed by the shield vias SH2A and SH3A as coupled together by a third conductor portion CP3A (shown as a broken line) near the top of the shield vias SH2A and SH3A and a fourth conductor portion CP4A near the bottom of the shield vias SH2A and SH3A. As a result, current is able to flow in a loop such as illustrated by a current flow (arrow) CF2A through the second shield loop SL2A. The first and third conductor portions CP1A and CP3A (shown as broken lines) may be formed in a ground layer or another layer of a PCB used to form the detector portion 167, as will be described in more detail below in reference to other figures. For simplicity of the illustration, a ground layer (or other layer corresponding to the first and third conductor portions CP1A and CP3A and other odd-numbered conductor portions noted below) is not explicitly shown in FIG. 4, but for which a similar layer is represented in FIGS. 8 and 9, as will be described in more detail below.

The second shield structure SST-B is located proximate to (and between) the set of sensor vias SSN-AB and the set of sensor vias SSN-CD, and includes two shield vias SH1B and SH2B to form one shield loop SL1B. The shield loop SL1B is formed by the shield vias SH1B and SH2B as coupled together by a fifth conductor portion CP1B (shown as a broken line) near the top of the shield vias SH1B and SH2B and a sixth conductor portion CP2B near the bottom of the shield vias SH1B and SH2B. As a result, current is able to flow in a loop to form a current flow (not shown) through the shield loop SL1B. The fifth conductor portion CP1B (shown as a broken line) may be formed in a ground layer or another layer of a PCB used to form the detector portion 167 as will be described in more detail below.

The third shield structure SST-C is located proximate to the set of sensor vias SSN-CD, and includes three shield vias SH1C, SH2C and SH3C to form first and second shield loops SL1C and SL2C. The first shield loop SL1C is formed by the shield vias SH1C and SH2C as coupled together by a seventh conductor portion CP1C (shown as a broken line) near the top of the shield vias SH1C and SH2C and an eighth conductor portion CP2C near the bottom of the shield vias SH1C and SH2C. As a result, current is able to flow in a loop to form a current flow through the first shield loop SL1C. Similarly, the second shield loop SL2C is formed by the shield vias SH2C and SH3C as coupled together by a ninth conductor portion CP3C (shown as a broken line) near the top of the shield vias SH2C and SH3C and a tenth conductor portion CP4C near the bottom of the shield vias SH2C and SH3C. As a result, current is able to flow in a loop to form a current flow through the second shield loop SL2C. The seventh and ninth conductor portion CP1C and CP3C (shown as broken lines) may be formed in a ground layer or another layer of a PCB used to form the detector portion 167 as will be described in more detail below.

In various exemplary embodiments, stray magnetic fields (e.g., resulting from vertical current flow in vertical field generating vias, to be described in more detail below), if present, would induce eddy currents to flow in the shield loops SL1A, SL2A, SL1B, SL1C and SL2C of the shield structures SST-A, SST-B and SST-C. Such eddy currents would thus cancel out the stray magnetic fields to prevent them from undesirably coupling to the parasitic sensor loops LSN-A, etc. (e.g., as part of a shielding function for at least partially shielding the sensor vias which are part of the parasitic sensor loops).

Figure 5:
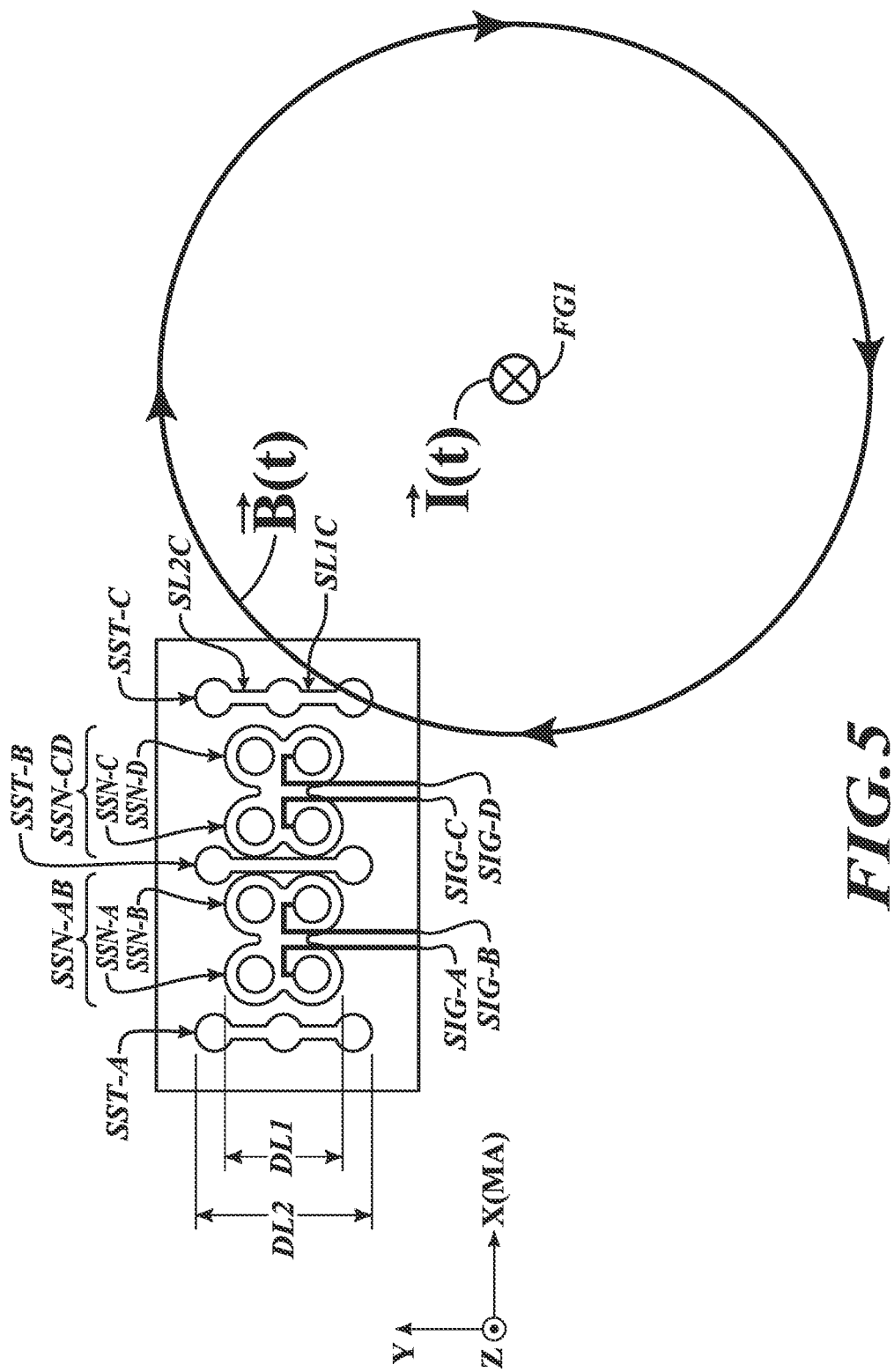
FIG. 5 is a diagram of a top view of the configuration of FIG. 4, and further illustrating a stray magnetic field as produced by current through a field generating via.
Figure 6:
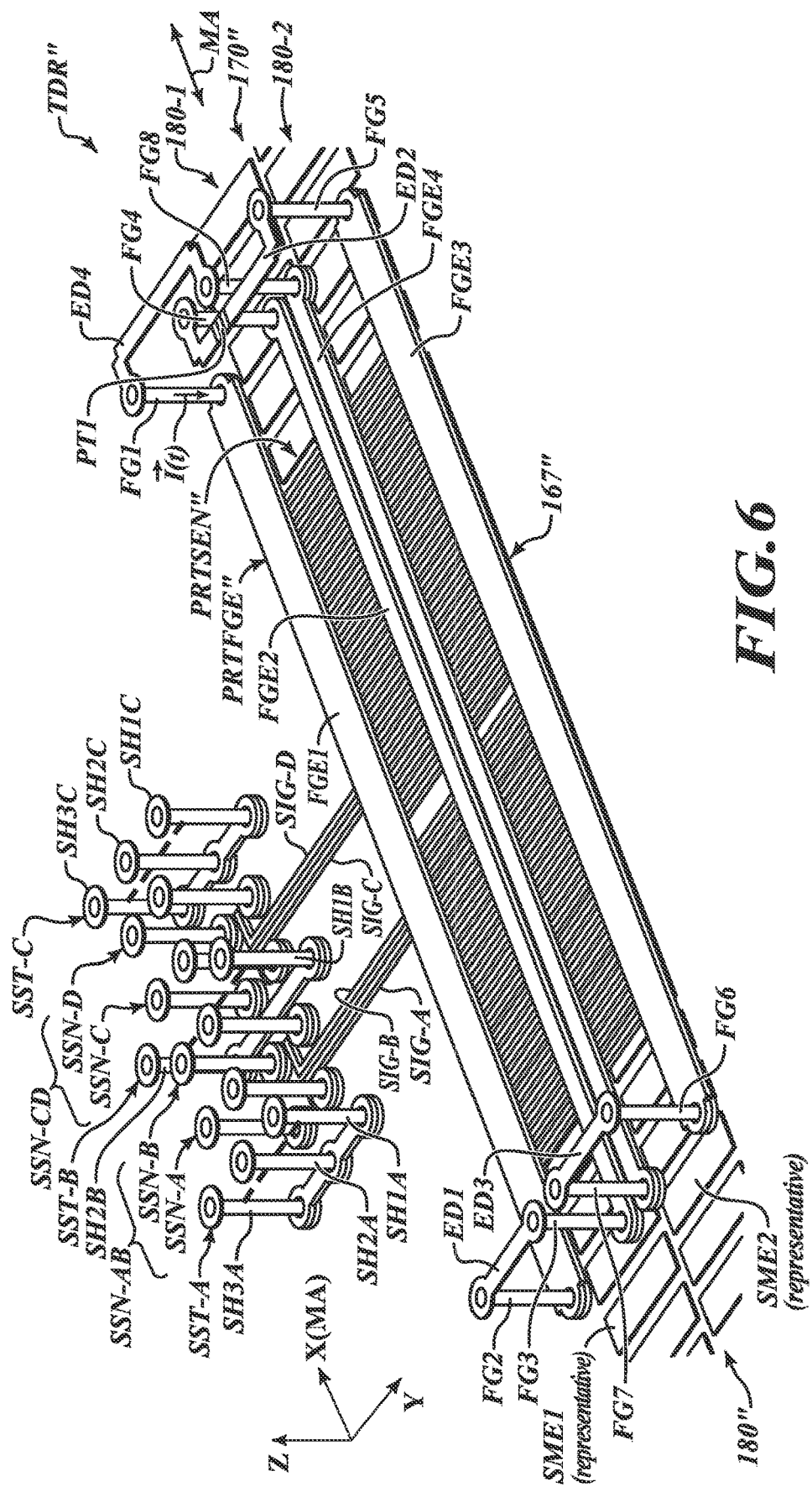
FIG. 6 is a diagram of an isometric view of an implementation of a transducer including a detector portion and a scale such as may be utilized in the inductive encoder system of FIG. 1, and illustrating field generating vias along with shield structures SST as located proximate to sets of sensor vias in arrangements similar to those of FIGS. 4 and 5.

FIG. 5 is a diagram of a top view of the configuration of FIG. 4, and further illustrating a stray magnetic field $\vec{B}(t)$ as produced by current $\vec{I}(t)$ through a field generating via FG1 (e.g., as further illustrated in FIG. 6). For example, vertical current flow $\vec{I}(t)$ in the vertical field generating via FG1 provided in the detector portion 167 undesirably produces the stray magnetic field $\vec{B}(t)$. Without the shield structures SST, such stray magnetic field $\vec{B}(t)$ would undesirably induce certain amounts of currents in the parasitic loops LSN-A, etc. which are formed in part by the sets of sensor vias SSN, resulting in an offset signal which introduces position error. By positioning the shield structures SST proximate to the sets of sensor vias SSN, eddy currents would flow in the shield loops SL of the shield structures SST to at least partially cancel out the stray fields such as the stray magnetic field $\vec{B}(t)$. This would desirably prevent/reduce the coupling of the stray fields to the parasitic sensor loops LSN-A, etc., to thus desirably reduce the signal offsets and corresponding offset variability. In the illustrated example, the third shield structure SST-C is shown as shielding the sets of sensor vias SSN, in particular the set of sensor vias SSN-D, from the stray magnetic field $\vec{B}(t)$, and the second shield structure SST-B is also shown as shielding the sets of sensor vias SSN, in particular the set of sensor vias SSN-B, from the stray magnetic field $\vec{B}(t)$.

In certain implementations, at least some of the sensor vias SN (e.g., the sensor vias SN in the sets of SSN-A, SSN-B, SSN-C or SSN-D) which the plurality of shield structures SST-A, SST-B and SST-C are located proximate to are in a linear arrangement that extends in a direction (e.g., a direction parallel to the y-axis direction) that is perpendicular to the measuring axis direction MA (e.g., a direction parallel to the x-axis direction). In accordance with certain implementations, a distance length DL2 of a linear arrangement of shield vias of a shield structure SST-A, SST-B or SST-C is at least as long as a distance length DL1 of a linear arrangement of sensor vias in SSN-A, SSN-B, SSN-C or SSN-D that the shield structure SST-A, SST-B or SST-C is proximate to.

In various implementations, it may be considered advantageous for a shield structure SST to in general have more shield vias SH and more corresponding shield loops SL than less (e.g., which may be more effective at shielding in relation to local strengths of a magnetic field, and for which the total number may also be limited by certain practical considerations, such as constraints/requirements of the PCB fabrication processes, etc.). For example, as illustrated in FIG. 5, in the third shield structure SST-C, the first shield loop SL1C formed by the lower and middle shield vias (e.g., SH1C and SH2C of FIG. 4) is closer to the field generating via FG1 and may receive a stronger local effect of the magnetic field $\vec{B}(t)$ than the second shield loop SL2C formed by the upper and middle shield vias (e.g., SH3C and SH2C of FIG. 4) which is further away from the field generating via FG1. As a result, more current may be induced in the first shield loop SL1C as compared to the second shield loop SL2C, which may result in a more effective shielding at the lower location in relation to the local strength of the magnetic field at that location. In this example, the first shield loop SL1C may provide better/improved shielding in comparison to a configuration having only a single shield loop (e.g., if the middle shield via SH2C was removed so that only one shield loop was formed between the upper and lower shield vias (e.g., SH3C and SH1C of FIG. 4).

FIG. 6 is a diagram of an isometric view of an implementation of a transducer TDR" including a detector portion 167" and a scale 170" (e.g., which may be particular implementations of the transducer TDR, detector portion 167, and scale 170 as described above with respect to FIG. 1). FIG. 6 also illustrates field generating vias FG along with shield structures SST as located proximate to sets of sensor vias SSN (e.g., in arrangements similar to those of FIGS. 4 and 5). The configuration of the shield structures SST-A, SST-B, SST-C as located proximate to the sets of sensor vias SSN-AB and SSN-CD in FIG. 6 is similar to those of FIGS. 4 and 5 and, thus, its detailed description will not be repeated.

It will be appreciated that certain aspects of the field generating elements (layers, etc.) and sensing elements (layers, etc.) of a detector portion (e.g., detector portion 167", etc.) as described herein may operate and be understood based at least in part on principles as described above with respect to FIG. 2. In the implementation of FIG. 6, the scale 170", the detector portion 167" and a processing portion 166 (e.g., of FIG. 1) work cooperatively to provide an inductive encoder (e.g., inductive encoder 101) that is usable to measure a relative position between two elements (e.g., between the detector portion 167" and the scale 170" and/or elements attached thereto), along a measuring axis direction MA.

In various implementations, the scale 170" extends along the measuring axis direction MA (e.g., corresponding to an x-axis direction) and includes first signal modulating elements SME1 and second signal modulating element SME2. The first signal modulating elements SME1 are disposed along the measuring axis direction MA according to, and thus form, a first scale pattern portion 180-1. The second signal modulating elements SME2 are disposed along the measuring axis direction MA according to, and thus form, a second scale pattern portion 180-2. The first scale pattern portion 180-1 and the second scale pattern portion 180-2 are respective parts of a periodic scale pattern 180" of the scale 170". In various implementations, the first and second signal modulating elements SME1 and SME2 may have a spatial phase offset relative to one another, and in various implementations may be arranged according to a same wavelength or a different wavelength (e.g., in accordance with intended interactions with the sets of sensing elements of the sensing portion PRTSEN", as will be understood by one skilled in the art). In various implementations, the periodic scale pattern 180" may alternatively be referred to as a signal modulating pattern 180".

The relative movement between the detector portion 167" and the scale 170" indicates relative positions and/or measurements (e.g., in relation to physical elements that may be coupled to the detector portion 167" or the scale 170", such as first and second objects or parts for determining a relative position between the first and second objects or parts, or first and second jaws (e.g., of a caliper) or other measurement elements that an object may be placed between for measuring a dimension of the object, etc.). A measured relative position or dimension may be displayed on a display (e.g., a digital display 138 of FIG. 1). The inductive encoder may also include various known elements (e.g., physical mounting and/or motion elements, etc.) that are configured to guide the movement of the detector portion 167" (e.g., for sliding, etc.) relative to the scale 170".

As shown in FIG. 6, the detector portion 167" may include a field generating portion PRTFGE" and the sensing portion PRTSEN" arranged along the measuring axis direction MA. In the example of FIG. 6, the sensing portion PRTSEN" includes four sets of sensing elements, each of which provides detector signals on a respective set of signal lines, including the illustrated sets of signal lines SIG-A, SIG-B, SIG-C and SIG-D, which couple to the corresponding sets of sensor vias SSN-A, SSN-B, SSN-C and SSN-D. The signal lines SIG-A, SIG-B, SIG-C and SIG-D and the corresponding sets of sensor vias SSN-A, SSN-B, SSN-C and SSN-D may be comparable to and have similar connections as those illustrated in FIGS. 3-5.

Each set of signal lines SIG-A, SIG-B, SIG-C and SIG-D may also be comparable to the set of signal lines SIG+ and SIG– as illustrated in FIG. 2. For example, for a first set of sensing elements in the sensing portion PRTSEN", the corresponding set of signal lines SIG-A may include a SIG+ signal line and a SIG-signal line, as coupled to a V+ terminal and a V– terminal, respectively of the first set of sensing elements. Similarly, for a second set of sensing elements in the sensing portion PRTSEN", the corresponding set of signal lines SIG-B may include a SIG+ signal line and a SIG– signal line, as coupled to a V+ terminal and a V– terminal, respectively of the second set of sensing elements, and so on for the third and fourth sets of sensing elements with the corresponding sets of signal lines SIG-C and SIG-D. In various implementations, in the sensing portion PRTSEN", the different sets of sensing elements may have spatial phase offsets relative to one another (e.g., in quadrature arrangements and/or as a four phase system, etc., as will be understood by one skilled in the art and as explained in more detail in the incorporated references).

In various implementations, such configurations may enable an absolute position (e.g., of the sensing portion PRTSEN" of the detector portion 167") to be determined along the measuring axis direction MA in relation to the scale 170". Such determinations/calculations may be based on the processing (e.g., by the processing portion 166) of the detector signals provided by the detector portion 167" (e.g., including the detector signals provided by the sensing portion PRTSEN" over the sets of signal lines SIG-A, SIG-B, SIG-C and SIG-D as coupled to the sets of sensor vias SSN-A, SSN-B, SSN-C and SSN-D, which couple to/provide the signals out to the processing portion 166). As will be described in more detail below, in accordance with principles as described herein, shield structures SST may be utilized to reduce the effects of stray magnetic fields (e.g., as produced by current flow through field generating vias, such as vias FG1-FG8), which could otherwise result in certain offset signals in relation to the detector signals from the sensing portion PRTSEN", which could otherwise result in certain errors in the position determinations/calculations that are based on the detector signals from the sensing portion PRTSEN". The current flow through the field generating vias FG1-FG8 and corresponding stray magnetic fields will be described in more detail below in relation to the operations of the field generating portion PRTFGE".

In various implementations, the field generating portion PRTFGE" may include a number of elongated portions FGE1-FGE4 and end portions ED1-ED4. The elongated portions FGE may generally extend along, and thus be parallel to, the measuring axis direction MA (e.g., and correspondingly the x-axis direction), while the end portions ED may generally be transverse (e.g., perpendicular) to the measuring axis direction MA (e.g., transverse to the x-axis direction, such that the end portions ED may extend along the y-axis direction). The elongated portions FGE and end portions ED in combination may form areas in which changing magnetic flux may be generated by current flow through the elongated portions FGE and end portions ED that results from drive signals, wherein the areas (e.g., interior areas) may include certain of the sensing elements.

For example, in various implementations, the field generating portion PRTFGE" may include elongated portions FGE1, FGE2, FGE3 and FGE4 and end portions ED1, ED2, ED3 and ED4 (e.g., which in some implementations may be regarded as forming two field generating element loops, such as in a figure-8 configuration, and/or otherwise as a single field generating element loop that forms two loops in such a configuration as to form two interior areas). More specifically, the elongated portions FGE1 and FGE2 and end portions ED1 and ED4 may be regarded as forming a first half loop with a first interior area that is configured to be aligned with the first half pattern portion 180-1 of the periodic scale pattern 180". The elongated portions FGE3 and FGE4 and end portions ED2 and ED3 may be regarded as forming a second half loop with an interior area that is configured to be aligned with the second half pattern portion 180-2 of the periodic scale pattern 180".

In the example of FIG. 6, the field generating vias FG1-FG8 provide connections between the elongated portions FGE and the end portions ED. In various implementations, the elongated portions FGE and the end portions ED may be included in different layers of a printed circuit board (PCB) and/or otherwise at different vertical positions (e.g., in order to achieve certain desirable operating properties, such as in relation to the magnetic fields from the current flow through the elongated portions FGE being closer and having more interaction with the signal modulating elements SME and sensing elements SEN than the magnetic fields from the current flow through the end portions ED). The field generating vias FG provide the connections between the different layers/vertical positions.

In the example of FIG. 6, the end portion ED1 is coupled to the elongated portions FGE1 and FGE2 by the field generating vias FG2 and FG3, respectively. The end portion ED2 is coupled to the elongated portions FGE2 and FGE3 by the field generating vias FG4 and FG5, respectively. The end portion ED3 is coupled to the elongated portions FGE3 and FGE4 by the field generating vias FG6 and FG7, respectively. The end portion ED4 is coupled to the elongated portions FGE1 and FGE4 by the field generating vias FG1 and FG8, respectively.

In various implementations, the end portion ED2 (e.g., or other part of the field generating portion PRTFGE") may be represented as including a port PT1 or other connection configuration. For example, the end portion ED2 may be divided into two parts, such as with two contact points provided in the port PT1 for the field generating portion PRTFGE" as illustrated in FIG. 6. The contact points in the port PT1 may be used to receive drive signals and may be provided at locations where signal lines/circuit traces from the processing portion 166 may connect, etc. In various implementations, the port PT1 may be representative of a general connection configuration (e.g., such as between the field generating vias FG4 and FG5), such as coupled to field generating drive electronics. Such field generating drive electronics may in various implementations include electronic components such as capacitors, transistors, etc., and as may be at least partially or fully included in or coupled to the processing portion 166, to provide the drive signals for causing the field generating portion PRTFGE" to generate changing magnetic flux. As described herein (e.g., with respect to FIG. 5), the corresponding current flows through the field generating portion PRTFGE" include current flows through the field generating vias FG1-FG8 (e.g., such as a vertical current flow $\vec{I}(t)$) which may produce stray magnetic fields (e.g., such as a stray magnetic field $\vec{B}(t)$), for which the shield structures SST as described herein are intended to reduce the undesirable effects of such stray magnetic fields on the detector/measurement signals of the inductive encoder.

Signal lines/circuit traces from the processing portion 166 connect (not shown) to the field generating portion PRTFGE" (e.g., for providing the drive signals). During operations, alternating current may be provided, although in order to simplify the following description only one direction of current is described (e.g., for purposes of example of one direction and/or as may occur in configurations where diodes or other components/configurations are provided to limit the current flow to one direction). As one example, current (e.g., as provided by drive signals) may flow through the following sequence of portions (e.g., in the following order for current in one direction), including: field generating via FG1; elongated portion FGE1; field generating via FG2, end portion ED1; field generating via FG3; elongated portion FGE2; field generating via FG4; end portion ED2; field generating via FG5; elongated portion FGE3; field generating via FG6; end portion ED3; field generating via FG7; elongated portion FGE4; field generating via FG8; and end portion ED4. In accordance with this example of current flow, it will be appreciated that the current flow is in the same direction (e.g., in a first direction along the x-axis/measuring axis direction MA) through the elongated portions (i.e., elongated portions FGE1 and FGE3) at the outer boundaries of the configuration, and is in the same direction (e.g., in a second direction that is opposite to the first direction along the x-axis/measuring axis direction MA) through the elongated portions (i.e., elongated portions FGE2 and FGE4) in the middle of the configuration, as may be desirable for certain implementations.

In various implementations, the detector portion 167" is configured to be mounted proximate to the periodic scale pattern 180" of the scale 170", and to move along the measuring axis direction MA relative to the periodic scale pattern 180" of the scale 170". In various implementations, the field generating portion PRTFGE" and the sensing portion PRTSEN" of the detector portion 167" may be formed according to a variety of alternative configurations to be used in combination with a variety of corresponding signal processing schemes, as will be understood by one skilled in the art.

It will be appreciated that various elements may reside on different fabrication layers located at different planes along the z-axis direction, as needed to provide various operating gaps and/or insulating layers, as will be apparent to one of ordinary skill in the art based on the description herein and the incorporated references. Throughout the figures of this disclosure, it will be appreciated that the illustrated x-axis, y-axis and/or z-axis dimensions of one or more elements may be exaggerated for clarity, and it will be understood that they are not intended to contradict the various design principles and relationships discussed herein.

Figure 7:
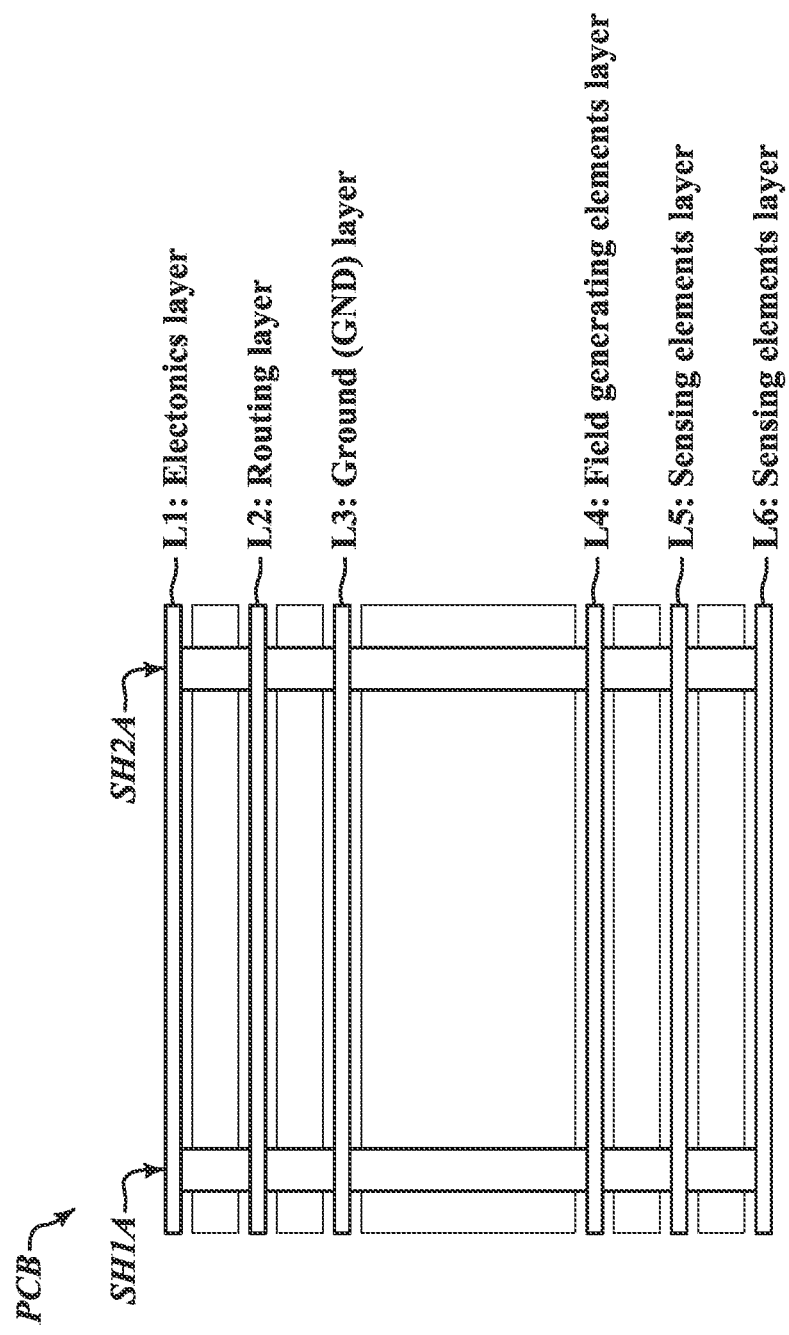
FIG. 7 is a diagram illustrating a cross-sectional portion of a printed circuit board (PCB) of a detector portion that includes two shield vias which extend through six layers of the PCB.

FIG. 7 is a diagram illustrating a cross-sectional portion of a printed circuit board (PCB) that includes two shield vias SH1A and SH2A which extend through six layers of the PCB. In various implementations, the illustrated portion may be part of an overall PCB that may be referenced as a "detector substrate" on which a detector portion (e.g., detector portion 167" of FIG. 6) is formed. As illustrated in FIG. 7, the PCB includes six layers L1-L6, for which each of the labeled layers L1-L6 is an electrical layer, and the layers between the labeled electrical layers L1-L6 are insulation layers. It will be appreciated that this configuration is intended to be illustrative only.

In various implementations, layers L1 and L2 comprise an electronics layer and a routing layer, respectively, and may include at least part of a processing portion which may be part of the processing portion 166 (FIG. 1), and/or which may otherwise be coupled thereto and/or assist with the provision and/or processing of the drive signals to the field generating portion PRTFGE" and/or detector signals from the sensing portion PRTSEN", etc. Layer L3 comprises a ground layer (GND) (e.g., for providing ground and/or other common connections, etc.). Layer L4 comprises a field generating elements layer, which may include at least some of the elements/parts of the field generating portion (e.g., PRTFGE" of FIG. 6). Layers L5 and L6 comprise sensing elements layers, which may include at least some of the elements/parts of the sensing portion (e.g., PRTSEN" of FIG. 6). In various implementations, the layers L5 and L6 may include most or all of the sets of sensing elements of the sensing portion PRTSEN", with different traces on the different layers L5 and L6 (e.g., to electronically isolate at crossover portions, etc.), and for which connections between the layers L5 and L6 for the sensing elements may be made by certain types of vias (e.g., such as micro vias which only extend between the layers L5 and L6, etc. and which in some implementations may also or alternatively be referenced as blind vias and/or buried vias).

As noted above, the particular view of FIG. 7 illustrates two shield vias SH1A and SH2A as extending through the six layers L1-L6 of the PCB. According to certain standard processes, vias may be made by a mechanical drill drilling a hole through layers of a printed circuit board, after which the hole is plated (e.g., with copper) to form the via. According to certain design rules for PCBs, vias, traces and/or other components or elements must have certain spacings between them, as well as other limitations on certain types of geometric relationships, etc. It is noted that the shield structures SST with the shield vias SH as disclosed herein may be formed in accordance with such standard processes.

Unlike more typical vias (e.g., such as the sensor vias SN and the field generating vias FG) which are connected to other electronic circuitry (e.g., connected to the processing portion 166), in various implementations the shield vias SH and corresponding shield structures SST as described herein are independent elements which stand alone and are not connected to or otherwise part of the connectivity for signals to or from other electronic circuitry (e.g., such as to or from the processing portion 166). In one example, if the shield vias SH1A and SH2A are each coupled to ground (e.g., to layer L3 (GND)) as forming an upper conductor portion CP1A (see FIG. 4), and are each coupled to layer L4 as forming a lower conductor portion CP2A (see FIG. 4), then a corresponding shield loop SL1A is formed, in which current may flow (e.g., in one particular example direction) up the shield via SH1A, across layer L3, down the shield via SH2A, and across layer L4. In general, conductor portions CP for coupling the shield vias SH to each other are included in particular layers of the PCB, such as further illustrated in FIGS. 8 and 9 below.

In various implementations, it may be desirable for the shield loops SL to at least span between layers L3 and L4. More specifically, in certain implementations the distance between layers L3 and L4 may be relatively large (e.g., on the order of 1.0 mm) while the distance between the layers L1 and L3 or between the layers L4 and L6 may be relatively smaller (e.g., on the order of 0.1 mm, for which in relation to such an example as noted above the z-axis dimensions of certain of the respective layers as illustrated in FIG. 7, such as between L1 and L3 and between L4 and L6, have been exaggerated for clearer illustrations of the respective layers). In such an example, the relative distance (e.g., along the z-axis) between the layers L3 and L4 (e.g., on the order of 1.0 mm), may be more than 10× the relative distance between the layers L1 and L2, or L2 and L3, or L4 and L5, or L5 and L6. In certain implementations, where the parasitic loops (e.g., LSN-A) include connections between the layer L1 and the layer L5 or L6, thus spanning more than the distance between layers L3 and L4, it may be desirable for the shield loops SL to span at least across the large distance between the layers L3 and L4, in order to effectively shield at least the majority of the area of the parasitic loops. As a specific example, when connecting the shield via SH1A to the shield via SH2A, if the layer L3 (or L1 or L2) is selected to form the upper conductor portion CP1A, then it may be desirable for the lower conductor portion to be at least in the layer L4 (or L5 or L6).

FIG. 8 is a diagram illustrating an isometric top view of the sets of sensor vias SSN-AB and SSN-CD along with the shield structures SST of FIG. 6, for which the shield vias SH of the shield structures SST are shown to be coupled together by conductor portions CP (e.g., upper conductor portions) as part of a ground layer (e.g., layer L3 (GND)) of the PCB. Specifically, the upper conductor portion CP1A which couples the shield via SH1A to the shield via SH2A in the first shield structure SST-A, the upper conductor portion CP3A which couples the shield via SH2A to the shield via SH3A also in the first shield structure SST-A, the upper conductor portion CP1B which couples the shield via SH1B to the shield via SH2B in the second shield structure SST-B, the upper portion CP1C which couples the shield via SH1C to the shield via SH2C in the third shield structure SST-C, and the upper portion CP3C which couples the shield via SH2C to the shield via SH3C also in the third shield structure SST-C are all formed in the ground layer L3 (GND) in the illustrated example. In this example, technically all of the shield vias SH are coupled together on one side by the layer L3 (e.g., the ground layer L3), and coupled together on the other side by conductor portions in another layer (e.g., the layer 4) to complete the shield loops SL, as will be illustrated in FIG. 9.

FIG. 9 is a diagram illustrating an isometric bottom view of the configuration of FIG. 8 (e.g., looking at the same layer L3 (GND) of FIG. 8 from below), for which the shield vias SH of the shield structures SST are shown to be coupled together by conductor portions CP (e.g., lower conductor portions) in a different layer of the PCB (e.g., in layer L4) than the ground layer L3, thus forming shield loops SL in the shield structures SST. Specifically, for each shield structure SST-A, SST-B or SST-C, the plurality of shield vias comprise at least a first shield via SH (e.g., SH1A) and a second shield via SH (e.g., SH2A), which are coupled together by a first conductor portion CP (e.g., upper conductor portion CP1A of FIG. 8) and are coupled together by a second conductor portion (e.g., lower conductor portion CP2A of FIG. 9). As a result, the first shield via (e.g., SH1A), the first conductor portion (e.g., CP1A), the second shield via (e.g., SH2A) and the second conductor portion (e.g., CP2A) form a first respective shield loop SL (e.g., SL1A) of the one or more shield loops (e.g., SL1A and SL2A of FIG. 4). Similarly, the lower conductor portions CP4A, CP2B, CP2C and CP4C may be formed in the layer L4 to respectively complete the other shield loops SL2A, SL1B, SL1C and SL2C.

The (lower) conductor portions CP2A, CP4A, CP2B, CP2C and CP4C shown in FIG. 9, which may be provided in the layer L4, may also or alternatively be referenced as "conductor straps." In alternative implementations, the conductor portions CP2A, CP4A, CP2B, CP2C and CP4C may be included in one of the other layers L5 or L6 (e.g., in a lower part of the PCB as described above), assuming the other (upper) conductor portions CP1A, CP3A, CP1B, CP1C and CP3C of all of the shield vias SH are included in one of the layers L1, L2 or L3 (e.g., in an upper part of the PCB). In various implementations, the (upper) conductor portions CP1A, CP3A, CP1B, CP1C and CP3C may also be formed as "conductor straps" (e.g., as included in one of the layers L1 or L2, and in which case all of the shield vias SH would not be coupled together on one side by a layer such as the ground layer L3).

Figure 10:
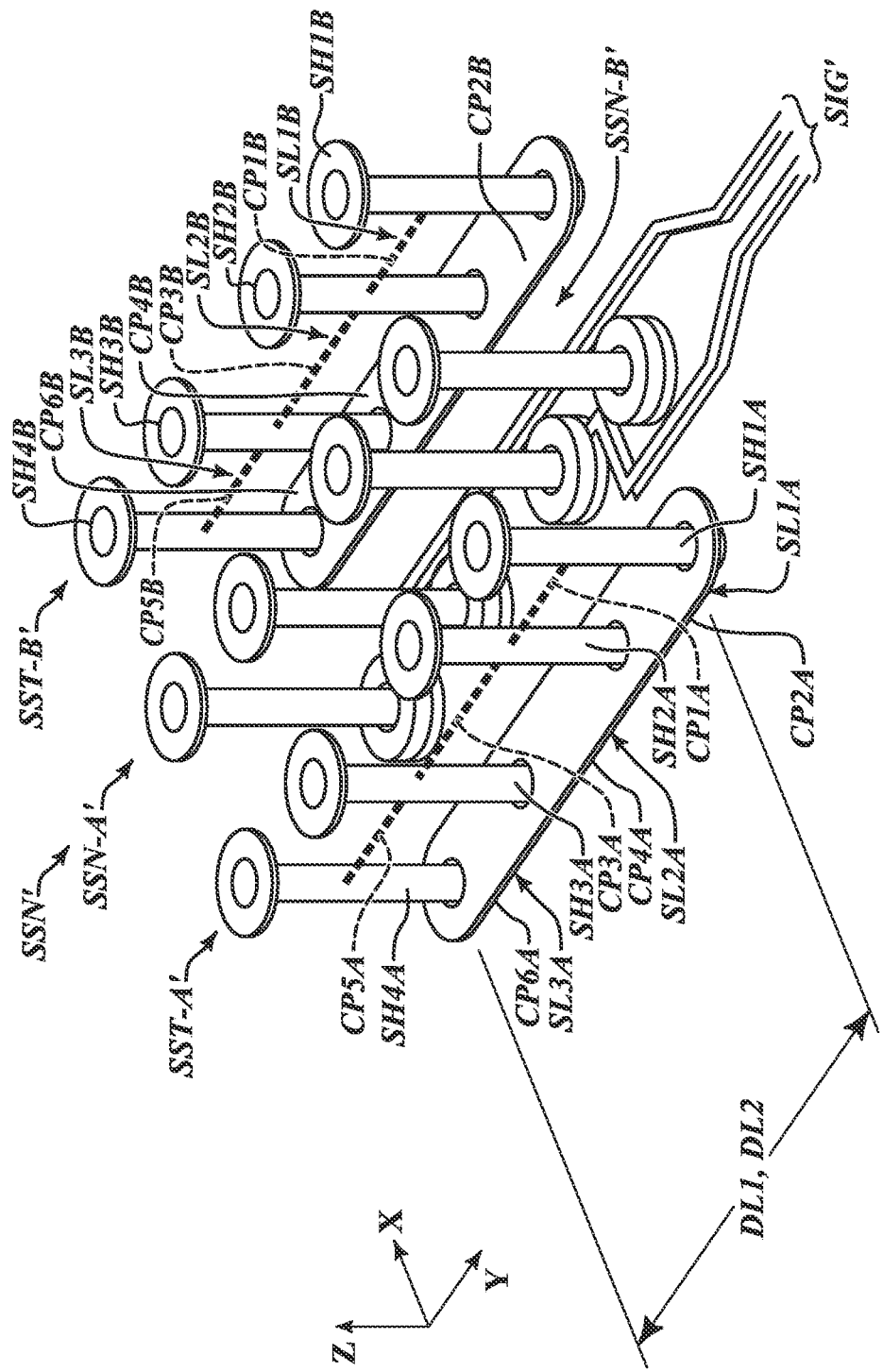
FIG. 10 is a diagram illustrating two shield structures SST each including four shield vias in linear arrangements and as located proximate to and on opposite sides of a set of sensor vias including four sensor vias in a linear arrangement.

FIG. 10 is a diagram illustrating two shield structures SST-A' and SST-B' each including four shield vias SH in linear arrangements (e.g., along the y-axis direction in FIG. 10) and as located proximate to and on opposite sides of a set of sensor vias SSN'. In the illustrated example, the set of sensor vias SSN' includes a first set of sensor vias SSN-A' including two sensor vias and a second set of sensor vias SSN-B' also including two sensor vias, to which signal lines SIG carry signals from respective sets of sensing elements (not shown).

Because each shield structure SST' includes four shield vias SH in the illustrated example, each shield structure SST' may possibly form at least three shield loops SL. Specifically, in the first shield structure SST-A', the first and second shied vias SH1A and SH2A may be coupled together by first and second conductor portions CP1A and CP2A to form the first shield loop SL1A, the second and third shield vias SH2A and SH3A may be coupled together by third and fourth conductor portions CP3A and CP4A to form the second shield loop SL2A, and the third and fourth shield vias SH3A and SH4A may be coupled together by fifth and sixth conductor portions CP5A and CP6A to form the third shield loop SL3A. Similarly, in the second shield structure SST-B', the first and second shield vias SH1B and SH2B may be coupled together by first and second conductor portions CP1B and CP2B to form the first shield loop SL1B, the second and third shield vias SH2B and SH3B may be coupled together by third and fourth conductor portions CP3B and CP4B to form the second shield loop SL2B, and the third and fourth shield vias SH3B and SH4B may be coupled together by fifth and sixth conductor portions CP5B and CP6B to form the third shield loop SL3B.

As illustrated in FIG. 10, at least some of the set of sensor vias (e.g., the sensor vias in the sets of SSN-A' and SSN-B') which the plurality of shield structures SST-A' and SST-B' are located proximate to are in a linear arrangement that extends in a direction (e.g., a direction parallel to the y-axis direction) that is perpendicular to the measuring axis direction MA (e.g., a direction parallel to the x-axis direction). In accordance with certain implementations, a distance length (e.g., DL2) of a linear arrangement of shield vias SH of a shield structure SST (e.g., SST-A', SST-B') is at least as long as a distance length (DL1) of a linear arrangement of sensor vias (e.g., sensor vias in SSN') that the shield structure (e.g., SST-A' or SST-B') is proximate to. In the particular example of FIG. 10, DL2 may be approximately equal to DL1, and a similar dimensional ratio (with approximately equal distance lengths) is shown in FIG. 11 below.

Figure 11:
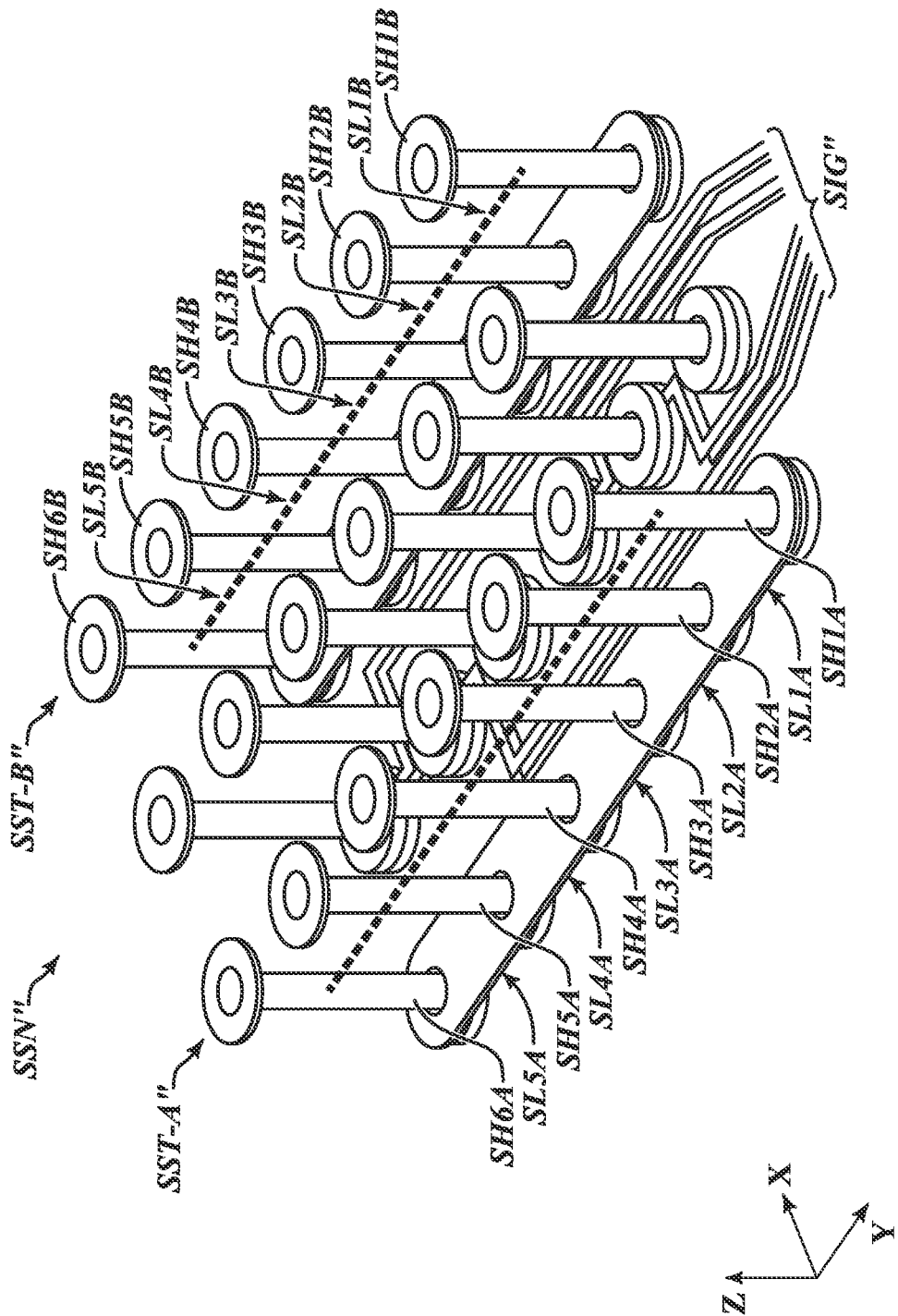
FIG. 11 is a diagram illustrating two shield structures SST each including six shield vias in linear arrangements and as located proximate to and on opposite sides of a set of sensor vias including six sensor vias in a linear arrangement.

FIG. 11 is a diagram illustrating two shield structures SST-A" and SST-B" each including six shield vias SH in linear arrangements (e.g., along the y-axis direction). The two shield structures SST-A" and SST-B" are located proximate to and on opposite sides of a set of sensor vias SSN"

including six sensor vias in a linear arrangement, to which signal lines SIG" carry signals from respective sets of sensing elements (not shown).

Because each shield structure SST" includes six shield vias SH1-SH6 in this example, each structure SST" may possibly form at least five shield loops SL. Specifically, in the first shield structure SST-A", the first and second shield vias SH1A and SH2A may be coupled together by upper and lower conductor portions CP to form the first shield loop SL1A, the second and third shield vias SH2A and SH3A may be coupled together by upper and lower conductor portions CP to form the second shield loop SL2A, the third and fourth shield vias SH3A and SH4A may be coupled together by upper and lower conductor portions CP to form the third shield loop SL3A, the fourth and fifth shield vias SH4A and SH5A may be coupled together by upper and lower conductor portions CP to form the fourth shield loop SL4A, and the fifth and sixth shield vias SH5A and SH6A may be coupled together by upper and lower conductor portions CP to form the fifth shield loop SL5A. Similarly, in the second shield structure SST-B", the first and second shield vias SH1B and SH2B may be coupled together by upper and lower conductor portions CP to form the first shield loop SL1B, the second and third shield vias SH2B and SH3B may be coupled together by upper and lower conductor portions CP to form the second shield loop SL2B, the third and fourth shield vias SH3B and SH4B may be coupled together by upper and lower conductor portions CP to form the third shield loop SL3B, the fourth and fifth shield vias SH4B and SH5B may be coupled together by upper and lower conductor portions CP to form the fourth shield loop SL4B, and the fifth and sixth shield vias SH5B and SH6B may be coupled together by upper and lower conductor portions CP to form the fifth shield loop SL5B.

Figure 12:
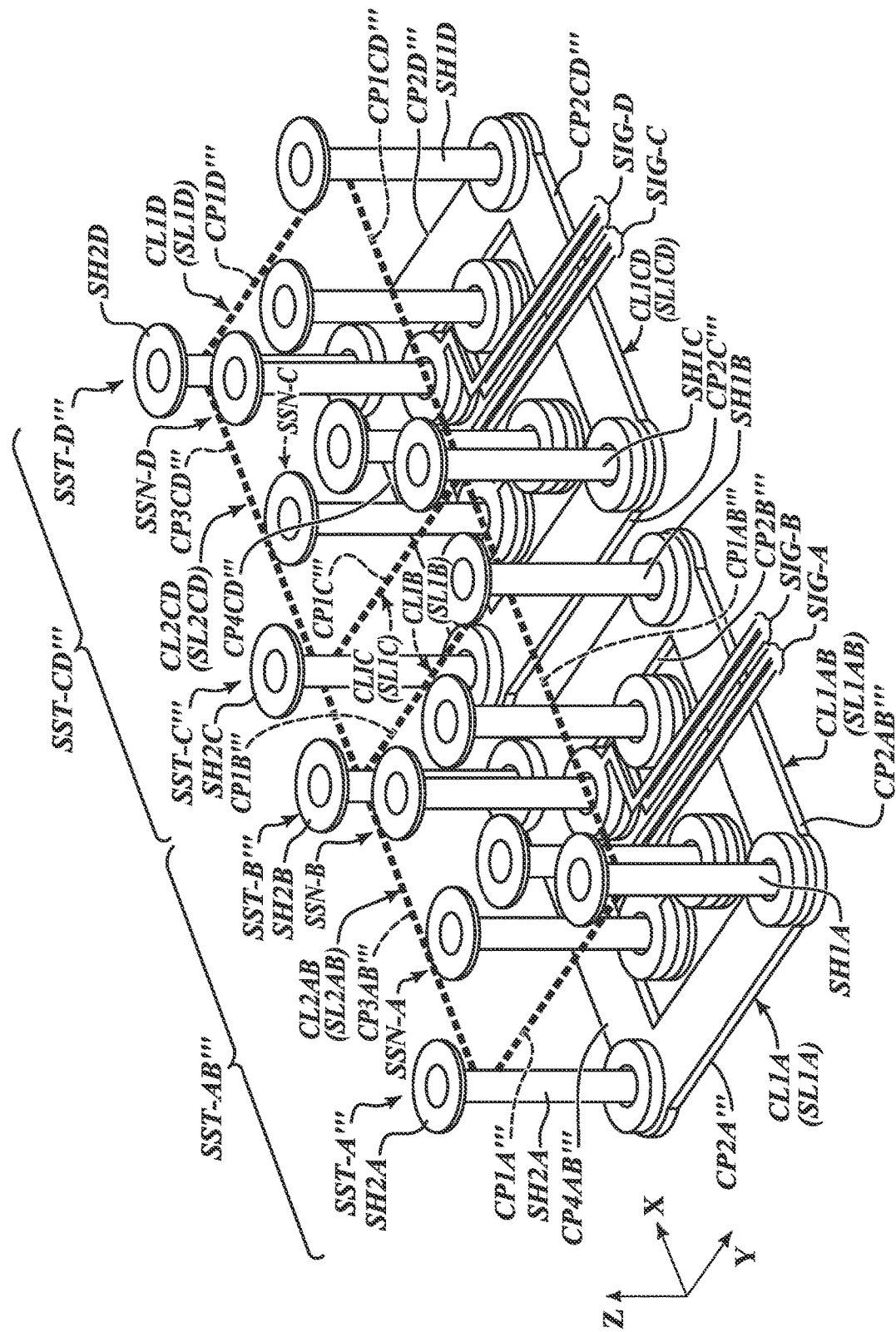
FIG. 12 is a diagram illustrating shield structures SST in two box arrangements as surrounding sets of sensor vias in arrangements similar to those of FIGS. 4-6.

FIG. 12 is a diagram illustrating two shield structures SST''' in box arrangements, each surrounding a set of sensor vias SSN that are in arrangements similar to those of FIGS. 4-6. Specifically, the first box arrangement SST-AB''' is formed of a first shield structure SST-A''' in which two shield vias SH1A and SH2A are coupled together by upper and lower conductor portions CP1A''' and CP2A''' to form a first shield loop SL1A having a current loop CL1A (e.g., in parallel to the YZ plane of the coordinate system), and a second shield structure SST-B''' in which two shield vias SH1B and SH2B are coupled together by upper and lower conductor portions CP1B''' and CP2B''' to form a second shield loop SL1B having a current loop CL1B (e.g., in parallel to the YZ plane). Further, in the first box arrangement SST-AB''', the first and second shield structures SST-A''' and SST-B''' are coupled together by upper conductor portions CP1AB''' and CP3AB''' and lower conductor portions CP2AB''' and CP4AB''' to form third and fourth shield loops SL1AB and SL2AB having current loops CL1AB and CL2AB (e.g., in parallel to the XZ plane).

In certain implementations, shield currents running in the XZ plane (e.g. through the current loops CL1AB and CL2AB) may distort the magnetic field passing through the scale 170 in the XY plane (e.g., in accordance with the above described operations of FIGS. 2 and 6) to change the quality/accuracy of the detector signals, in which case the box arrangement SST-AB''' may be considered less desirable than other configurations of the shield structures SST described above. Alternatively, in certain implementations it may be desirable to have shield currents running in the XZ plane (e.g. through the current loops CL1AB and CL2AB), for which the box arrangement SST-AB''' may be considered more desirable.

Similarly to the first box arrangement SST-AB''', the second box arrangement SST-CD''' is formed of a first shield structure SST-C''' in which two shield vias SH1C and SH2C are coupled together by upper and lower conductor portions CP1C''' and CP2C''' to form a first shield loop SL1C having a current loop CL1C (e.g., in parallel to the YZ plane of the coordinate system), and a second shield structure SST-D''' in which two shield vias SH1D and SH2D are coupled together by upper and lower conductor portions CP1D''' and CP2D''' to form a second shield loop SL1D having a current loop CL1D (e.g., in parallel to the YZ plane). Further, in the second box arrangement SST-CD''', the first and second shield structures SST-C''' and SST-D''' are coupled together by upper conductor portions CP1CD''' and CP3CD''' and lower conductor portions CP2CD''' and CP4CD''' to form third and fourth shield loops SL1CD and SL2CD having current loops CL1CD and CL2CD (e.g., in parallel to the XZ plane).

With the first and second box arrangements SST-AB''' and SST-CD''', shield currents may additionally run in the XY plane, for example, through the upper conductor portions CP1A''', CP1AB''', CP1B''' and CP3AB''', or through the lower conductor portions CP2A''', CP2AB''', CP2B''' and CP4AB''', or through the upper conductor portions CP1C''', CP1CD''', CP1D''' and CP3CD''', or through the lower conductor portions CP2C''', CP2CD''', CP2D''' and CP4CD'''. Similar to the potential currents running in the XZ plane, in various implementations the potential currents running in the XY plane may be considered more or less desirable.

FIG. 13 is a flow diagram illustrating a routine 1300 for operating an inductive encoder system, which may be configured as described in detail above. The method includes generally three steps. In block 1310, the first step includes providing a drive signal that causes a field generating portion PRTFGE of a detector portion 167 of an inductive encoder 101 to generate a changing magnetic flux. The operation of the field generating portion PRTFGE produces one or more stray magnetic fields, and the detector portion 167 includes a sensing portion PRTSEN comprising one or more sets of sensing elements SETSEN arranged along a measuring axis direction MA. Each set of sensing elements SETSEN is coupled to a set of sensor vias SN, and the detector portion 167 is configured to move along the measuring axis direction MA relative to a scale 170 that includes signal modulating elements SME.

In block 1320, the second step includes receiving detector signals from the sensing portion PRTSEN, wherein at least one set of sensor vias SN is at least partially shielded from the one or more stray magnetic fields by the plurality of shield structures SST. For example, at least some sensor vias SN of the at least one set of sensor vias SSN form at least part of one or more parasitic loops, and the shielding of the at least one set of sensor vias SSN reduces an offset signal portion in the detector signals that would otherwise result from the one or more stray magnetic fields coupling to the one or more parasitic loops, if the shield structures SST were not present.

In block 1330, the third step includes determining a relative position between the detector portion 167 and the scale 170 based at least in part on the detector signals. To this end, the plurality of shield structures SST may be configured to prevent the determined relative position from including at least a portion of a position error that would otherwise be caused by the offset signal portion as would result if the shield structures SST were not present.

It will be appreciated that the principles disclosed and claimed herein may be readily and desirably combined with various features disclosed in the incorporated references. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An inductive encoder system configured to measure a relative position between two elements along a measuring axis direction, the system comprising:
   a scale extending along the measuring axis direction which includes a periodic scale pattern comprising signal modulating elements;
   a detector portion configured to be positioned proximate to the periodic scale pattern and to move along the measuring axis direction relative to the periodic scale pattern, the detector portion comprising:
      a field generating portion PRTFGE configured to generate a changing magnetic flux in response to a drive signal; and
      a sensing portion PRTSEN comprising one or more sets of sensing elements arranged along the measuring axis direction, wherein each set of sensing elements is coupled to a set of sensor vias, and the sensing portion PRTSEN is configured to provide detector signals which respond to a local effect on the changing magnetic flux provided by adjacent signal modulating elements of the periodic scale pattern; and
   a plurality of shield structures SST, wherein each shield structure SST is located proximate to a set of sensor vias and comprises a plurality of shield vias, and in each shield structure SST one or more shield loops are formed by the plurality of shield vias as coupled together by conductor portions, wherein:
      the plurality of shield structures SST comprise: a first shield structure which comprises a first plurality of shield vias; and a second shield structure which comprises a second plurality of shield vias; and
      the first and second shield structures SST, and correspondingly the first and second pluralities of shield vias, are located on opposite sides of a first set of sensor vias which comprises at least two sensor vias that are coupled to a set of sensing elements of the sensing portion PRTSEN.

2. The system of claim 1, wherein for each shield structure SST, the plurality of shield vias comprise at least a first shield via and a second shield via, which are coupled together by a first conductor portion and are coupled together by a second conductor portion, for which the first shield via, the first conductor portion, the second shield via and the second conductor portion form a first respective shield loop of the one or more shield loops.

3. The system of claim 2, wherein for one or more shield structures SST of the plurality of shield structures SST, the plurality of shield vias comprise at least a third respective shield via, which is coupled to the second shield via by a third conductor portion and is coupled to the second shield via by a fourth conductor portion, for which the second shield via, the third conductor portion, the third shield via and the fourth conductor portion form a second respective shield loop of the one or more shield loops.

4. The system of claim 3, wherein for each shield structure SST, the plurality of shield vias are in a linear arrangement.

5. The system of claim 2, wherein the first conductor portion is in a first layer of a printed circuit board and the second conductor portion is in a second layer of the printed circuit board.

6. The system of claim 1, wherein the first set of sensor vias comprises at least four sensor vias.

7. The system of claim 1, wherein the field generating portion PRTFGE comprises a set of field generating vias, and each plurality of shield vias are configured to at least partially shield at least some of the sensor vias from one or more magnetic fields resulting from current flowing in one or more field generating vias of the set of field generating vias.

8. The system of claim 1, wherein:
   the shield vias of the first plurality of shield vias are in a linear arrangement that extends in a direction that is perpendicular to the measuring axis direction; and
   the shield vias of the second plurality of shield vias are in a linear arrangement that extends in a direction that is perpendicular to the measuring axis direction.

9. The system of claim 8, wherein at least some sensor vias of the first set of sensor vias which the first and second shield structures SST are located on opposite sides of are in a linear arrangement that extends in a direction that is perpendicular to the measuring axis direction.

10. The system of claim 9, wherein a distance length of the linear arrangement of the first plurality of shield vias of the first shield structure SST is at least as long as a distance length of the linear arrangement of the sensor vias of the first set of sensor vias.

11. The system of claim 1, wherein the field generating portion PRTFGE comprises one or more field generating elements surrounding an interior area that is aligned with at least part of the periodic scale pattern of signal modulating elements during operation, wherein the one or more field generating elements are configured to generate the changing magnetic flux in the interior area in response to the drive signal.

12. The system of claim 11, wherein each shield structure SST is configured to at least partially shield a proximate set of sensor vias from stray magnetic fields that result from the operation of the field generating portion PRTFGE.

13. The system of claim 1, wherein members of the sets of sensing elements comprise loops.

14. The system of claim 1, wherein the one or more sets of the sensing elements comprises at least a first set of sensing elements and at least one additional set of sensing elements, wherein each additional set of sensing elements has a spatial phase offset relative to the first set of sensing elements.

15. A method of operating an inductive encoder system configured to measure a relative position between two elements along a measuring axis direction,
   the inductive encoder system comprising:
      a scale extending along the measuring axis direction which includes a periodic scale pattern comprising signal modulating elements;
      a detector portion configured to be positioned proximate to the periodic scale pattern and to move along the measuring axis direction relative to the periodic scale pattern, the detector portion comprising:
  a field generating portion PRTFGE configured to generate a changing magnetic flux in response to a drive signal; and
  a sensing portion PRTSEN comprising one or more sets of sensing elements arranged along the measuring axis direction, wherein each set of sensing elements is coupled to a plurality sensor vias, and the sensing portion PRTSEN is configured to provide detector signals which respond to a local effect on the changing magnetic flux provided by adjacent signal modulating elements of the periodic scale pattern; and
  a plurality of shield structures SST, wherein each shield structure SST is located proximate to a set of sensor vias and comprises a plurality of shield vias, and in each shield structure SST one or more shield loops are formed by the plurality of shield vias as coupled together by conductor portions, wherein
    the plurality of shield structures SST comprise: a first shield structure which comprises a first plurality of shield vias; and a second shield structure which comprises a second plurality of shield vias; and
    the first and second shield structures SST, and correspondingly the first and second pluralities of shield vias, are located on opposite sides of a first set of sensor vias which comprises at least two sensor vias that are coupled to a set of sensing elements of the sensing portion PRTSEN;
the method comprising:
  providing a drive signal that causes the field generating portion PRTFGE to generate the changing magnetic flux, wherein the operation of the field generating portion PRTFGE produces one or more stray magnetic fields;
  receiving detector signals from the sensing portion PRTSEN, wherein the first set of sensor vias is at least partially shielded from the one or more stray magnetic fields by the first and second shield structures; and
  determining a relative position between the detector portion and the scale based at least in part on the detector signals.

16. The method of claim 15, wherein at least some sensor vias of the first set of sensor vias form at least part of one or more parasitic loops, and the shielding of the first set of sensor vias reduces an offset signal portion in the detector signals that would otherwise result from the one or more stray magnetic fields coupling to the one or more parasitic loops if the first and second shield structures were not present.

17. The method of claim 15, wherein the relative position does not include a position error that would otherwise result if the first and second shield structures were not present.

18. A detector portion for use in an inductive encoder configured to measure a relative position between two elements along a measuring axis direction, the encoder including a scale extending along the measuring axis direction which includes a periodic scale pattern comprising signal modulating elements, wherein the detector portion is configured to be positioned proximate to the periodic scale pattern and to move along the measuring axis direction relative to the periodic scale pattern, the detector portion comprising:
  a field generating portion PRTFGE configured to generate a changing magnetic flux in response to a drive signal;
  a sensing portion PRTSEN comprising one or more sets of sensing elements arranged along the measuring axis direction, wherein each set of sensing elements is coupled to a plurality sensor vias, and the sensing portion PRTSEN is configured to provide detector signals which respond to a local effect on the changing magnetic flux provided by adjacent signal modulating elements of the periodic scale pattern; and
  a plurality of shield structures SST, wherein each shield structure SST is located proximate to a set of sensor vias and comprises a plurality of shield vias, and in each shield structure SST one or more shield loops are formed by the plurality of shield vias as coupled together by conductor portions, wherein:
    the plurality of shield structures SST comprise: a first shield structure which comprises a first plurality of shield vias; and a second shield structure which comprises a second plurality of shield vias; and
    the first and second shield structures SST, and correspondingly the first and second pluralities of shield vias, are located on opposite sides of a first set of sensor vias which comprises at least two sensor vias that are coupled to a set of sensing elements of the sensing portion PRTSEN.

19. The system of claim 1, wherein:
the plurality of shield structures SST further comprise a third shield structure which comprises a third plurality of shield vias; and
the second and third shield structures SST, and correspondingly the second and third pluralities of shield vias, are located on opposite sides of a second set of sensor vias which comprises at least two sensor vias.

20. The system of claim 19, wherein:
the shield vias of the first plurality of shield vias are in a linear arrangement that extends in a direction that is perpendicular to the measuring axis direction;
the shield vias of the second plurality of shield vias are in a linear arrangement that extends in a direction that is perpendicular to the measuring axis direction;
the shield vias of the third plurality of shield vias are in a linear arrangement that extends in a direction that is perpendicular to the measuring axis direction;
at least some sensor vias of the first set of sensor vias are in a linear arrangement that extends in a direction that is perpendicular to the measuring axis direction; and
at least some sensor vias of the second set of sensor vias are in a linear arrangement that extends in a direction that is perpendicular to the measuring axis direction.

* * * * *